US010669958B2

United States Patent
Hoshi et al.

(10) Patent No.: US 10,669,958 B2
(45) Date of Patent: Jun. 2, 2020

(54) ESTIMATION DEVICE AND CONTROL DEVICE FOR COMBUSTION SYSTEM

(71) Applicant: DENSO CORPORATION, Kariya, Aichi-pref. (JP)

(72) Inventors: Shinya Hoshi, Kariya (JP); Atsunori Okabayashi, Kariya (JP)

(73) Assignee: DENSO CORPORATION, Kariya (JP)

( * ) Notice: Subject to any disclaimer, the term of this patent is extended or adjusted under 35 U.S.C. 154(b) by 98 days.

(21) Appl. No.: 15/773,584

(22) PCT Filed: Sep. 13, 2016

(86) PCT No.: PCT/JP2016/076878
§ 371 (c)(1),
(2) Date: May 4, 2018

(87) PCT Pub. No.: WO2017/081930
PCT Pub. Date: May 18, 2017

(65) Prior Publication Data
US 2018/0320616 A1    Nov. 8, 2018

(30) Foreign Application Priority Data

Nov. 12, 2015    (JP) .................................. 2015-222312

(51) Int. Cl.
*F02D 41/02*    (2006.01)
*F02D 41/40*    (2006.01)
(Continued)

(52) U.S. Cl.
CPC ......... *F02D 41/02* (2013.01); *F02D 13/0207* (2013.01); *F02D 19/0636* (2013.01);
(Continued)

(58) Field of Classification Search
CPC .. F02D 41/02; F02D 41/0077; F02D 19/0636; F02D 13/0207; F02D 45/00;
(Continued)

(56) References Cited

U.S. PATENT DOCUMENTS 6,230,683 B1 * 5/2001 zur Loye .................. F02B 1/12
123/27 GE
6,276,334 B1 * 8/2001 Flynn ...................... F02B 19/14
123/435
(Continued)

FOREIGN PATENT DOCUMENTS

JP    11-173201    6/1999
JP    2009-138688    6/2009
(Continued)

OTHER PUBLICATIONS

U.S. Appl. No. 15/773,578 of Hoshi, et al., filed May 4, 2018, entitled Estimation Device and Control Device for Combustion System (72 pages).
(Continued)

*Primary Examiner* — Hung Q Nguyen
*Assistant Examiner* — Susan E Scharpf
(74) *Attorney, Agent, or Firm* — Nixon & Vanderhye, P.C.

(57) ABSTRACT

An estimation device that is applicable to a combustion system including an internal combustion engine includes a mixing acquisition unit, a combustion amount estimation unit, a region estimation unit, and a timing estimation unit. The mixing acquisition unit acquires a mixing ratio of various components contained in the fuel used for combustion in the internal combustion engine. The combustion amount estimation unit estimates a combustion amount of the fuel caused by a pilot combustion produced by injecting the fuel into a combustion chamber of the internal combus-
(Continued)

tion engine with a pilot injection, based on the mixing ratio acquired by the mixing acquisition unit. The region estimation unit estimates a combustion region of the pilot combustion in the combustion chamber based on the mixing ratio. The timing estimation unit estimates an ignition timing, at which an ignition occurs in the combustion chamber with the pilot injection, based on the mixing ratio.

3 Claims, 13 Drawing Sheets

(51) Int. Cl.
*F02D 41/00* (2006.01)
*F02D 41/04* (2006.01)
*F02D 35/02* (2006.01)
*F02D 45/00* (2006.01)
*F02D 13/02* (2006.01)
*F02D 19/06* (2006.01)
*F02D 41/14* (2006.01)

(52) U.S. Cl.
CPC .......... *F02D 35/02* (2013.01); *F02D 35/028* (2013.01); *F02D 41/0025* (2013.01); *F02D 41/0077* (2013.01); *F02D 41/047* (2013.01); *F02D 41/403* (2013.01); *F02D 45/00* (2013.01); *F02D 41/005* (2013.01); *F02D 2041/1433* (2013.01)

(58) Field of Classification Search
CPC .... F02D 41/0025; F02D 35/028; F02D 35/02; F02D 41/403; F02D 41/047; F02D 2041/1433; F02D 41/005
See application file for complete search history.

(56) References Cited

U.S. PATENT DOCUMENTS

| 6,286,482 | B1* | 9/2001 | Flynn | F02B 1/12 |
| | | | | 123/25 C |
| 2005/0188948 | A1* | 9/2005 | Miura | F02D 41/0002 |
| | | | | 123/299 |
| 2008/0223344 | A1* | 9/2008 | Suzuki | F02D 19/0628 |
| | | | | 123/525 |
| 2008/0243358 | A1 | 10/2008 | Kojima et al. | |
| 2010/0010725 | A1* | 1/2010 | Ito | F02B 11/00 |
| | | | | 701/103 |
| 2010/0186368 | A1* | 7/2010 | Ikeda | F02C 7/264 |
| | | | | 60/39.821 |
| 2011/0079194 | A1* | 4/2011 | Tanaka | F02D 41/3035 |
| | | | | 123/295 |
| 2011/0088657 | A1* | 4/2011 | Tanno | F02D 35/028 |
| | | | | 123/305 |
| 2012/0199100 | A1* | 8/2012 | Kamio | F02D 19/0671 |
| | | | | 123/445 |
| 2015/0252745 | A1* | 9/2015 | Naruse | F02D 35/028 |
| | | | | 123/294 |

FOREIGN PATENT DOCUMENTS

| JP | 2011-196367 | 10/2011 |
| JP | 2012-132411 | 7/2012 |
| JP | 2012-241640 | 12/2012 |
| JP | 2012-255392 | 12/2012 |

OTHER PUBLICATIONS

U.S. Appl. No. 15/773,583 of Hoshi, et al., filed May 4, 2018, entitled Estimation Device and Control Device for Combustion System (52 pages).
U.S. Appl. No. 15/773,590 of Hoshi, et al., filed May 4, 2018, entitled Estimation Device and Control Device for Combustion System (70 pages).
U.S. Appl. No. 15/773,604 of Okabayashi, et al., filed May 4, 2018, entitled Combustion System Estimation Device and Control Device, (70 pages).
U.S. Appl. No. 15/773,625 of Hoshi, et al., filed May 4, 2018, Estimation Device and Control Device for Combustion System, (60 pages).
U.S. Appl. No. 15/773,578, filed May 4, 2018, Estimation Device and Control Device for Combustion System.
U.S. Appl. No. 15/773,583, filed May 4, 2018, Estimation Device and Control Device for Combustion System.
U.S. Appl. No. 15/773,584, filed May 4, 2018, Estimation Device and Control Device for Combustion System.
U.S. Appl. No. 15/773,590, filed May 4, 2018, Estimation Device and Control Device for Combustion System.
U.S. Appl. No. 15/773,604, filed May 4, 2018, Combustion System Estimation Device and Control Device.
U.S. Appl. No. 15/773,625, filed May 4, 2018, Estimation Device and Control Device for Combustion System.

* cited by examiner

FIG. 3

$$\begin{Bmatrix} \text{MIXING AMOUNT OF} \\ \text{LINEAR PARAFFINS} \\ \text{MIXING AMOUNT OF NAPHTHENES} \\ \text{MIXING AMOUNT OF} \\ \text{SIDE CHAIN PARAFFINS} \\ \text{MIXING AMOUNT OF AROMATICS} \\ \cdots \end{Bmatrix} = \begin{Bmatrix} a_{00} & \cdots & a_{0Y} \\ \vdots & \ddots & \vdots \\ a_{X0} & \cdots & a_{XY} \end{Bmatrix} \cdot \begin{Bmatrix} \text{IGNITION DELAY TIME TD}(i) &: P(i), T(i), O_2(i), P_c(i) \\ \text{IGNITION DELAY TIME TD}(j) &: P(j), T(j), O_2(j), P_c(j) \\ \text{IGNITION DELAY TIME TD}(k) &: P(k), T(k), O_2(k), P_c(k) \\ \text{IGNITION DELAY TIME TD}(l) &: P(l), T(l), O_2(l), P_c(l) \\ \cdots \end{Bmatrix}$$

MOLECULAR STRUCTURAL SPECIES     CONSTANTS     FLAMMABILITY PARAMETERS

FIG. 4
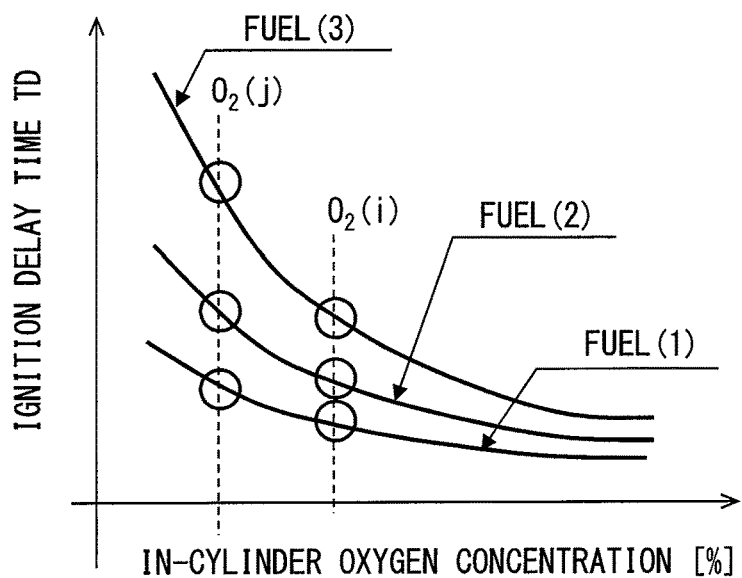
FIG. 5
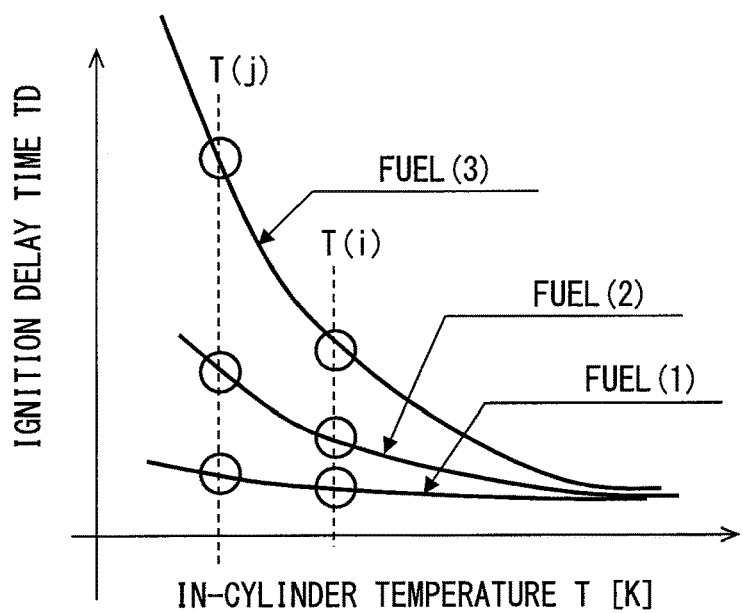
FIG. 6
|  | MOLECULAR STRUCTURE TYPE A | MOLECULAR STRUCTURE TYPE B | MOLECULAR STRUCTURE TYPE C |
|---|---|---|---|
| FUEL (1) | LARGE | LARGE | SMALL |
| FUEL (2) | SMALL | LARGE | SMALL |
| FUEL (3) | LARGE | SMALL | LARGE |

FIG. 12

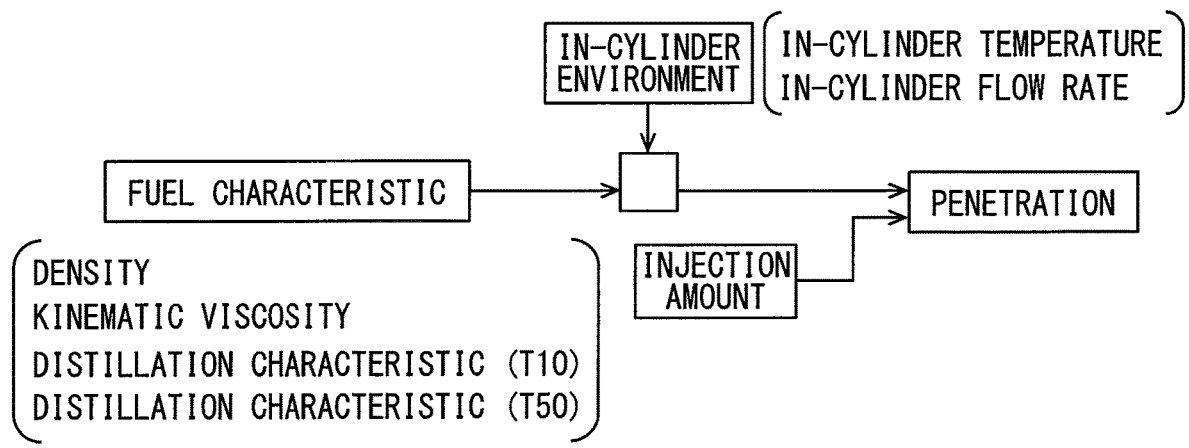

FIG. 13

$$\begin{pmatrix} \text{PENETRATION P1} \\ \text{PENETRATION P2} \\ \text{PENETRATION P3} \\ \cdots \end{pmatrix} = \begin{bmatrix} b_{00} & \cdots & b_{0Y} \\ \vdots & \ddots & \vdots \\ b_{X0} & \cdots & b_{XY} \end{bmatrix} \cdot \begin{pmatrix} \text{KINEMATIC VISCOSITY} \\ \text{DENSITY} \\ \text{DISTILLATION CHARACTERISTIC : T10} \\ \text{DISTILLATION CHARACTERISTIC : T50} \\ \cdots \end{pmatrix}$$

FIG. 14

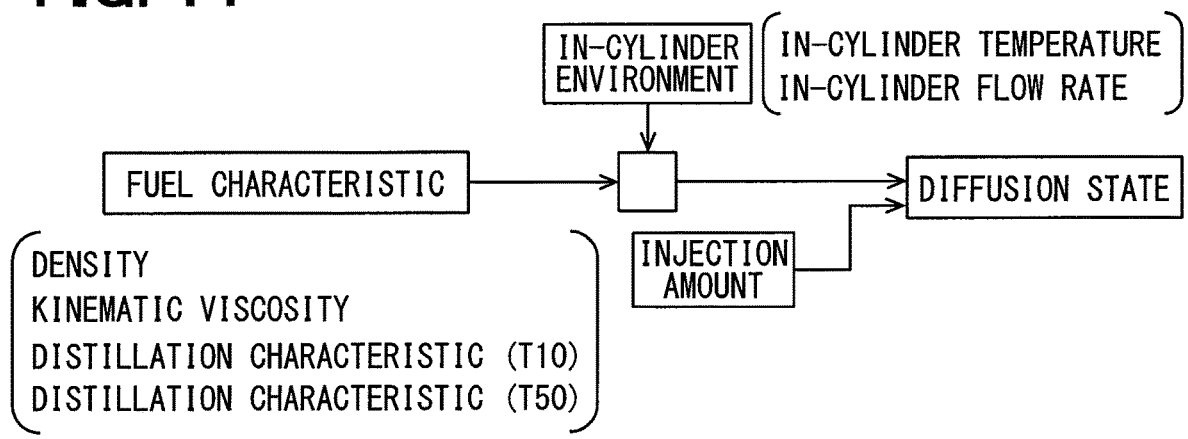

FIG. 15

$$\begin{pmatrix} \text{DIFFUSION STATE D1} \\ \text{DIFFUSION STATE D2} \\ \text{DIFFUSION STATE D3} \\ \cdots \end{pmatrix} = \begin{pmatrix} c_{00} & \cdots & c_{0Y} \\ \vdots & \ddots & \vdots \\ c_{X0} & \cdots & c_{XY} \end{pmatrix} \cdot \begin{pmatrix} \text{KINEMATIC VISCOSITY} \\ \text{DENSITY} \\ \text{DISTILLATION CHARACTERISTIC : T10} \\ \text{DISTILLATION CHARACTERISTIC : T50} \\ \cdots \end{pmatrix}$$

FIG. 16

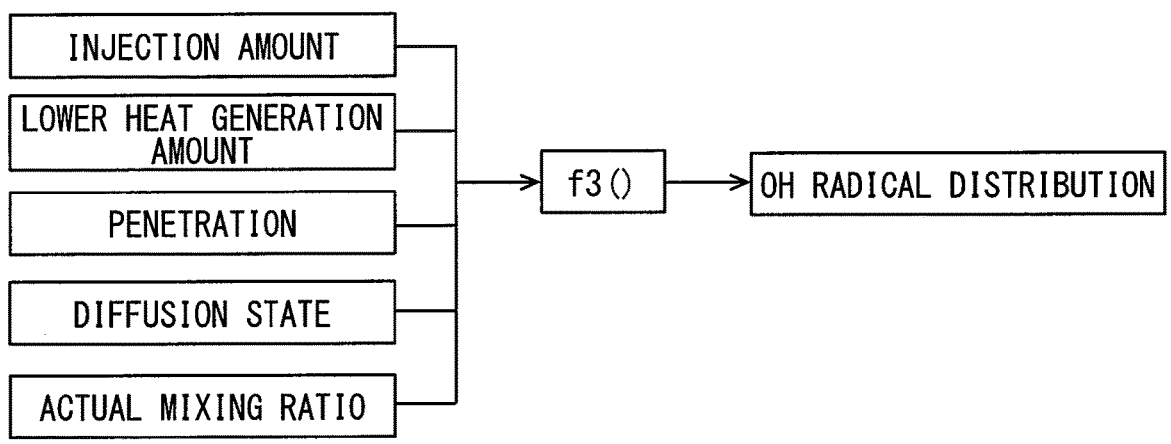

FIG. 17
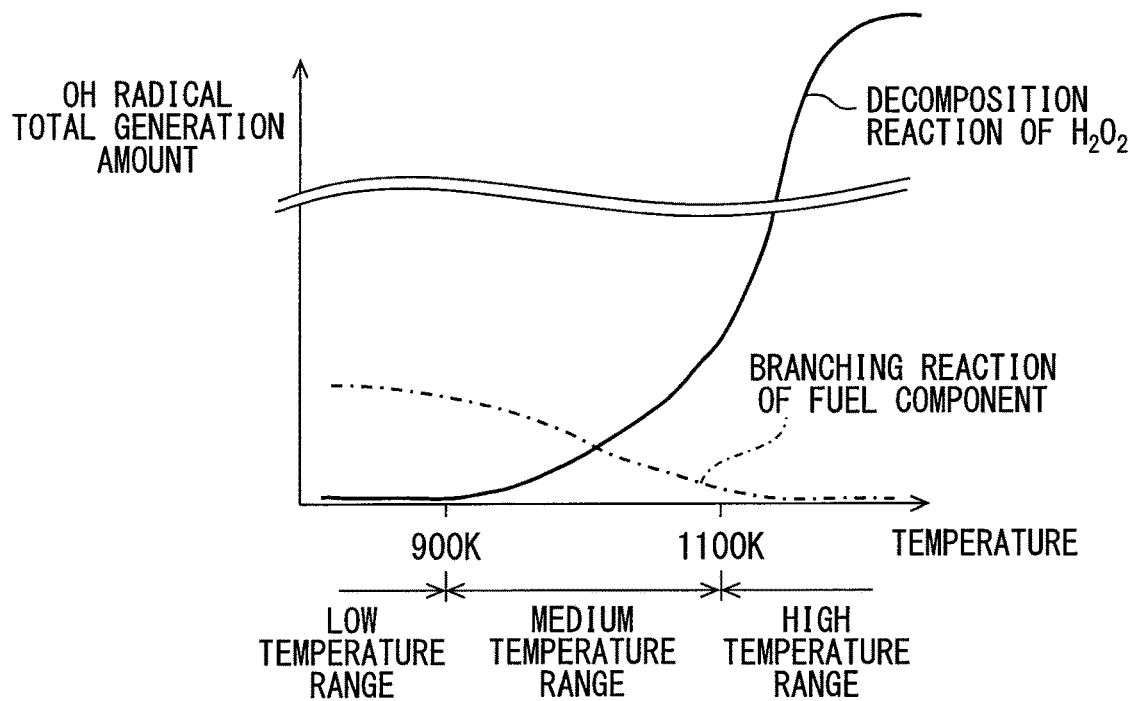
FIG. 18
$$\underbrace{Q_{burn}[J]}_{\substack{\text{COMBUSTION}\\\text{AMOUNT}}} = \underbrace{\alpha\,[-]}_{\substack{\text{COMBUSTION}\\\text{RATE}}} \cdot \rho\,[g/mm^3] \cdot \underbrace{Q_{inj}\,[mm^3/st]}_{\substack{\text{INJECTION}\\\text{AMOUNT}}} \cdot \underbrace{A\,[J/g]}_{\substack{\text{LOWER}\\\text{HEAT GENERATION}\\\text{AMOUNT}}}$$
FIG. 19
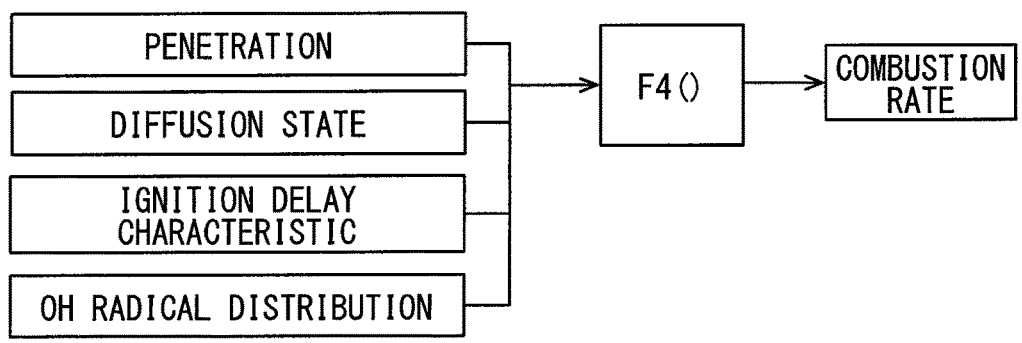

US 10,669,958 B2

ESTIMATION DEVICE AND CONTROL DEVICE FOR COMBUSTION SYSTEM

CROSS REFERENCE TO RELATED APPLICATION

This application is the U.S. national phase of International Application No. PCT/JP2016/076878 filed Sep. 13, 2016, which designated the U.S. and claims priority to Japanese Patent Application No. 2015-222312 filed on Nov. 12, 2015, the entire contents of each of which are incorporated herein by reference.

TECHNICAL FIELD

The present disclosure relates to an estimation device, which is to estimate a combustion state by a pilot injection in a combustion system, and a control device to control the combustion system.

BACKGROUND ART

Conventionally, a known technique for a combustion system having an internal combustion engine is multistage injection to inject a fuel into a combustion chamber for multiple times in one combustion cycle. In Patent Literature 1, for example, a good diffusion combustion of a main injection executed after a pilot injection can be achieved by controlling an injection amount and the like and by using the pilot injection in a multistage injection as a target. In the above configuration, a pilot injection amount is set by using a latent heat of vaporization of the fuel that remarkably differs. For example, the pilot injection amount increases in accordance with an increase in latent heat of vaporization of the fuel.

PRIOR ART LITERATURE

Patent Literature

Patent Literature 1: JP2012-132411A

However, a fuel having various properties exists as a fuel used for combustion in diesel internal combustion engines. Thus, when a component contained in a fuel that is a diesel fuel having a latent heat of vaporization relatively the same as a lower alcohol including ethanol and the like differs or when a mixing ratio of the component differs, it is possible that a required diffusion combustion for the main injection is not obtained even though an injection amount of the pilot injection is set according to a magnitude of an average latent heat of vaporization. In other words, in a configuration where a control of the pilot injection is executed according to the magnitude of the average latent of vaporization of the fuel, it is possible that a combustion state caused by the main injection is unstable.

SUMMARY OF INVENTION

It is an object of the present disclosure to produce an estimation device and a control device to enable to adjust a state of a main combustion generated by a main injection by managing a pilot injection in a combustion system.

According to a first mode of the present disclosure, an estimation device is applicable to a combustion system having an internal combustion engine and includes a mixing acquisition unit to acquire a mixing ratio of various components contained in fuel used for combustion in the internal combustion engine. The estimation device further includes a combustion amount estimation unit to estimate a combustion amount of the fuel caused by a pilot combustion generated by injecting the fuel into a combustion chamber of the internal combustion engine by the pilot injection, based on the mixing ratio acquired by the mixing acquisition unit. The estimation device further includes a region estimation unit to estimate a combustion region of the pilot combustion in the combustion chamber based on the mixing ratio. The estimation device further includes a timing estimation unit to estimate an ignition timing, at which an ignition occurs in the combustion chamber with the pilot injection, based on the mixing ratio.

According to a second mode of the present disclosure, an estimation device is applicable to a combustion system having an internal combustion engine and includes a mixing acquisition unit to acquire a mixing ratio of various components contained in fuel used for combustion in the internal combustion engine. The estimation device further includes an OH radical estimation unit to estimate a generation state of an OH radical in a combustion chamber of the internal combustion engine as an OH radical distribution, based on the mixing ratio acquired by the mixing acquisition unit, in response to the fuel injected to the combustion chamber by the pilot injection. The estimation device further includes an ignition delay estimation unit to estimate a characteristic of the fuel when ignited as an ignition delay characteristic, based on the mixing ratio.

According to a third mode of the present disclosure, a control device is applicable to a combustion system having an internal combustion engine and includes a mixing acquisition unit to acquire a mixing ratio of various components contained in fuel used for combustion in the internal combustion engine. The control device further includes a combustion amount estimation unit to estimate a combustion amount of the fuel caused by a pilot combustion generated by injecting the fuel into a combustion chamber of the internal combustion engine by the pilot injection, based on the mixing ratio acquired by the mixing acquisition unit. The control device further includes a region estimation unit to estimate a combustion region of the pilot combustion in the combustion chamber based on the mixing ratio. The control device further includes a timing estimation unit to estimate an ignition timing, at which an ignition occurs in the combustion chamber with the pilot injection, based on the mixing ratio. The control device further comprises a combustion control unit to control the combustion system based on respective estimation results of the combustion amount estimation unit, the region estimation unit, and the timing estimation unit.

BRIEF DESCRIPTION OF DRAWINGS

The above and other objects, features and advantages of the present disclosure will become more apparent from the following detailed description made with reference to the accompanying drawings. In the drawings:

FIG. 3 is a diagram illustrating a relationship among multiple ignition delay characteristics, parameters representing flammability, and mixing amounts of various components;

FIG. 4 is a diagram showing a relationship between a characteristic line representing a change in the ignition delay characteristic caused due to an in-cylinder oxygen concentration and a molecular structural species of a fuel;

FIG. 5 is a diagram showing a relationship between the characteristic line representing a change in the ignition delay characteristic caused due to an in-cylinder temperature and a molecular structural species of the fuel;

FIG. 6 is a view showing a relationship between a characteristic line specified based on an ignition delay characteristic and a mixing ratio of a molecular structural species;

FIG. 12 is a diagram illustrating estimation of the penetration as an injection parameter;

FIG. 13 is a diagram showing a formula for estimating the penetration;

FIG. 14 is a diagram illustrating estimation of a diffusion state as the injection parameter;

FIG. 15 is a diagram showing a formula for estimating the diffusion state;

FIG. 16 is a flowchart showing a procedure of ignition delay estimation processing;

FIG. 17 is a diagram illustrating a generation amount of OH radicals;

FIG. 18 is a diagram showing a formula for estimating a combustion amount as the combustion parameter;

FIG. 19 is a diagram showing a formula for estimating a combustion rate;

DESCRIPTION OF EMBODIMENTS

Figure 1:
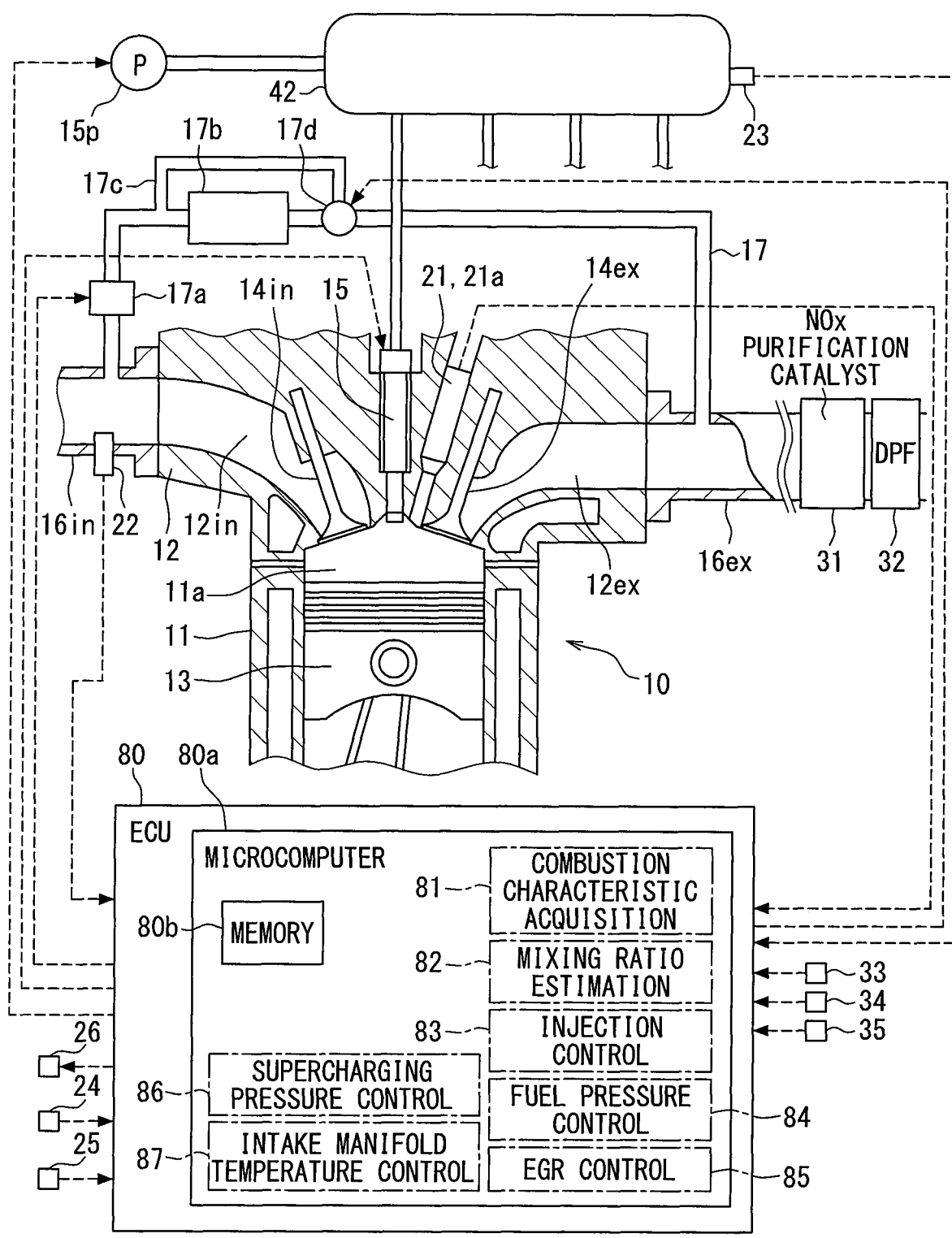
FIG. 1 is a schematic diagram of a combustion system according to a first embodiment.

Multiple embodiment for inventing referring to an As follows, drawing is described. In the following description of the embodiments, the same reference numerals will be used to refer to the same and already described elements and description thereof will be omitted in some cases. When only a part of a configuration in each embodiment is changed, the other parts of the configuration can be configured as the same as a prior embodiment.

First Embodiment

An estimation device and a control device for a combustion system according to the present embodiment are produced with an electronic control device (ECU 80) shown in FIG. 1. The ECU 80 includes a microcomputer (microcomputer 80a), an input processing circuit, an output processing circuit, and the like (none shown). The microcomputer 80a includes a central processing unit (CPU) not shown and a memory 80b. The CPU executes a predetermined program stored in the memory 80b, thereby to cause the microcomputer 80a to control the operation of a fuel injection valve 15, a fuel pump 15p, an EGR valve 17a, a temperature control valve 17d, and a supercharging pressure regulator 26 and the like included in the combustion system. Under those controls, a combustion state of the internal combustion engine 10 in the combustion system is controlled in a desired state. The combustion system and the ECU 80 are mounted in a vehicle, and the vehicle travels with the use of an output power of the internal combustion engine 10 as a driving source.

The internal combustion engine 10 includes a cylinder block 11, a cylinder head 12, a piston 13, and the like. An intake valve 14in, an exhaust valve 14ex, a fuel injection valve 15, and an in-cylinder pressure sensor 21 are equipped to the cylinder head 12.

The fuel pump 15p pumps a fuel in the fuel tank to a common rail 15c. The ECU 80 controls the operation of the fuel pump 15p, as a result of which the fuel in the common rail 15c is stored in the common rail 15c in a state where the fuel is maintained at a target pressure Ptrg. The common rail 15c distributes the accumulated fuel to the fuel injection valves 15 of the respective cylinders. The fuel injected from the fuel injection valve 15 mixes with an intake air in the combustion chamber 11a to form an air-fuel mixture, and the air-fuel mixture is compressed by the piston 13 and self-ignited. In short, the internal combustion engine 10 is a compression self-ignition type diesel engine, and a light oil is used as the fuel. Incidentally, as the fuel injection by the fuel injection valve 15, there is spray spraying the fuel in the form of mist.

The fuel injection valve 15 is configured by accommodating an electromagnetic actuator and a valve body inside a body. When the ECU 80 causes the energization of the electromagnetic actuator, an electromagnetic attraction force of the electromagnetic actuator causes a leak passage of a back pressure chamber (not shown) to open. The valve body opens in association with a reduction in the back pressure, and an injection hole provided in the body is opened. Thus, the fuel is injected from the injection hole. When the energization is turned off, the valve body is closed and the fuel injection is stopped.

An intake pipe 16in and an exhaust pipe 16ex are connected to an intake port 12in and an exhaust port 12ex, which are provided in the cylinder head 12, respectively. An EGR pipe 17 is connected to the intake pipe 16in and the exhaust pipe 16ex. A part (EGR gas) of the exhaust gas flows (returns) to the intake pipe 16in through the EGR pipe 17. An EGR valve 17a is equipped to the EGR pipe 17. The ECU 80 controls the operation of the EGR valve 17a, thereby to control an opening degree of the EGR pipe 17, and to control a flow rate of the EGR gas.

Furthermore, an EGR cooler 17b for cooling the EGR gas, a bypass pipe 17c, and a temperature control valve 17d are equipped to an upstream portion of the EGR valve 17a of the EGR pipe 17. The bypass pipe 17c defines a bypass flow channel that causes the EGR gas to bypass the EGR cooler 17b. The temperature control valve 17d adjusts the opening degree of the bypass flow channel, thereby to adjust a ratio between the EGR gas flowing through the EGR cooler 17b and the EGR gas flowing through the bypass flow channel, and finally to adjust a temperature of the EGR gas flowing into the intake pipe 16in. In this example, the intake air flowing into the intake port 12in contains an external air (fresh air) flowing from the intake pipe 16in and the EGR gas. Therefore, the adjustment of the temperature of the EGR gas with the temperature control valve 17d represents the adjustment of the temperature (intake manifold temperature) of the intake air flowing into the intake port 12in.

The combustion system is provided with a supercharger not shown. The supercharger has a turbine that is attached to the exhaust pipe 16ex and a compressor that is attached to the intake pipe 16in. When the turbine rotates due to a flow energy of the exhaust gas, the compressor rotates by the rotational force of the turbine, and the fresh air is compressed (supercharged) by the compressor. The supercharging pressure regulator 26 described above is a device for changing a capacity of the turbine. The ECU 80 controls the operation of the supercharging pressure regulator 26 to adjust the turbine capacity, thereby to control a supercharging pressure caused by the compressor.

In addition, the combustion system includes a NOx purification catalyst 31 and a DPF 32. The NOx purification catalyst 31 includes an adsorption catalyst that adsorbs nitrogen oxide NOx in the exhaust gas, a reduction catalyst that reduces NOx to nitrogen $N_2$, and the like. The DPF 32 (Diesel Particulate Filter) is a fine particle collecting device that is located in the further downstream side of the NOx purification catalyst 31, and collects fine particles contained in the exhaust gas. The exhaust gas flowing through the exhaust pipe 16ex passes through both of the NOx purification catalyst 31 and the DPF 32 and is subsequently discharged from a downstream end of the exhaust pipe 16ex. In the combustion system, the NOx purification catalyst 31 and the DPF 32 configure an exhaust gas purification device.

The ECU 80 receives detection signals from various sensors such as the in-cylinder pressure sensor 21, an oxygen concentration sensor 22, a rail pressure sensor 23, a crank angle sensor 24, an accelerator pedal sensor 25, an exhaust gas temperature sensor 33, an exhaust gas pressure sensor 34, and a catalyst temperature sensor 35.

The in-cylinder pressure sensor 21 outputs a detection signal corresponding to a pressure (in-cylinder pressure) of the combustion chamber 11a. The in-cylinder pressure sensor 21 has a temperature detection element 21a in addition to the pressure detection element, and outputs a detection signal corresponding to a temperature (in-cylinder temperature) of the combustion chamber 11a. The oxygen concentration sensor 22 is equipped to the intake pipe 16in and outputs a detection signal corresponding to an oxygen concentration in the intake air. The intake air to be detected is a mixture of fresh air and EGR gas. The rail pressure sensor 23 is equipped to the common rail 15c and outputs a detection signal corresponding to the pressure (rail pressure) of the accumulated fuel. The crank angle sensor 24 outputs a detection signal corresponding to the rotational speed (engine speed) of the crankshaft that is rotationally driven by the piston 13. The accelerator pedal sensor 25 outputs a detection signal corresponding to the depression amount (engine load) of an accelerator pedal depressed by a vehicle driver.

The exhaust gas temperature sensor 33 is equipped to the exhaust pipe 16ex, and detects an exhaust gas temperature. The exhaust gas pressure sensor 34 is equipped to the exhaust pipe 16ex, and detects an exhaust gas pressure. The exhaust gas temperature sensor 33 and the exhaust gas pressure sensor 34 are located between the NOx purification catalyst 31 and the turbine in the exhaust pipe 16ex.

The catalyst temperature sensor 35 is located between the NOx purification catalyst 31 and the DPF 32 in the exhaust pipe 16ex and detects an internal temperature of the NOx purification catalyst 31, thereby to detect the temperature of the exhaust gas that has passed through the NOx purification catalyst 31. The catalyst temperature sensor 35 may be equipped to the NOx purification catalyst 31.

The ECU 80 controls operations of the fuel injection valve 15, the fuel pump 15p, the EGR valve 17a, the temperature control valve 17d, and the supercharging pressure regulator 26, based on the respective detection signals of the sensors 21 to 25 and 33 to 35. In this way, a fuel injection start timing, the injection amount, an injection pressure, an EGR gas flow rate, an intake manifold temperature and a supercharging pressure are controlled.

While controlling the operation of the fuel injection valve 15, the microcomputer 80a functions as an injection control unit 83 to control the fuel injection start timing, the injection amount, and the number of injection stages related to the multistage injection. There is a case where the injection control is performed so that the same fuel injection valve 15 injects the fuel for multiple times (multistage injection) during one combustion cycle. The multiple injection include a main injection with the largest injection amount, a pilot injection performed at a timing before the main injection, and a post injection performed at a timing after the main injection.

While controlling the operation of the fuel pump 15p, the microcomputer 80a functions as a fuel pressure control unit 84 that controls the injection pressure. While controlling the operation of the EGR valve 17a, the microcomputer 80a functions as an EGR control unit 85 that controls the EGR gas flow rate. While controlling the operation of the temperature control valve 17d, the microcomputer 80a functions as an intake manifold temperature control unit 87 that controls the intake manifold temperature. While controlling the operation of the supercharging pressure regulator 26, the microcomputer 80a functions as a supercharging pressure control unit 86 that controls the supercharging pressure.

Figure 2:
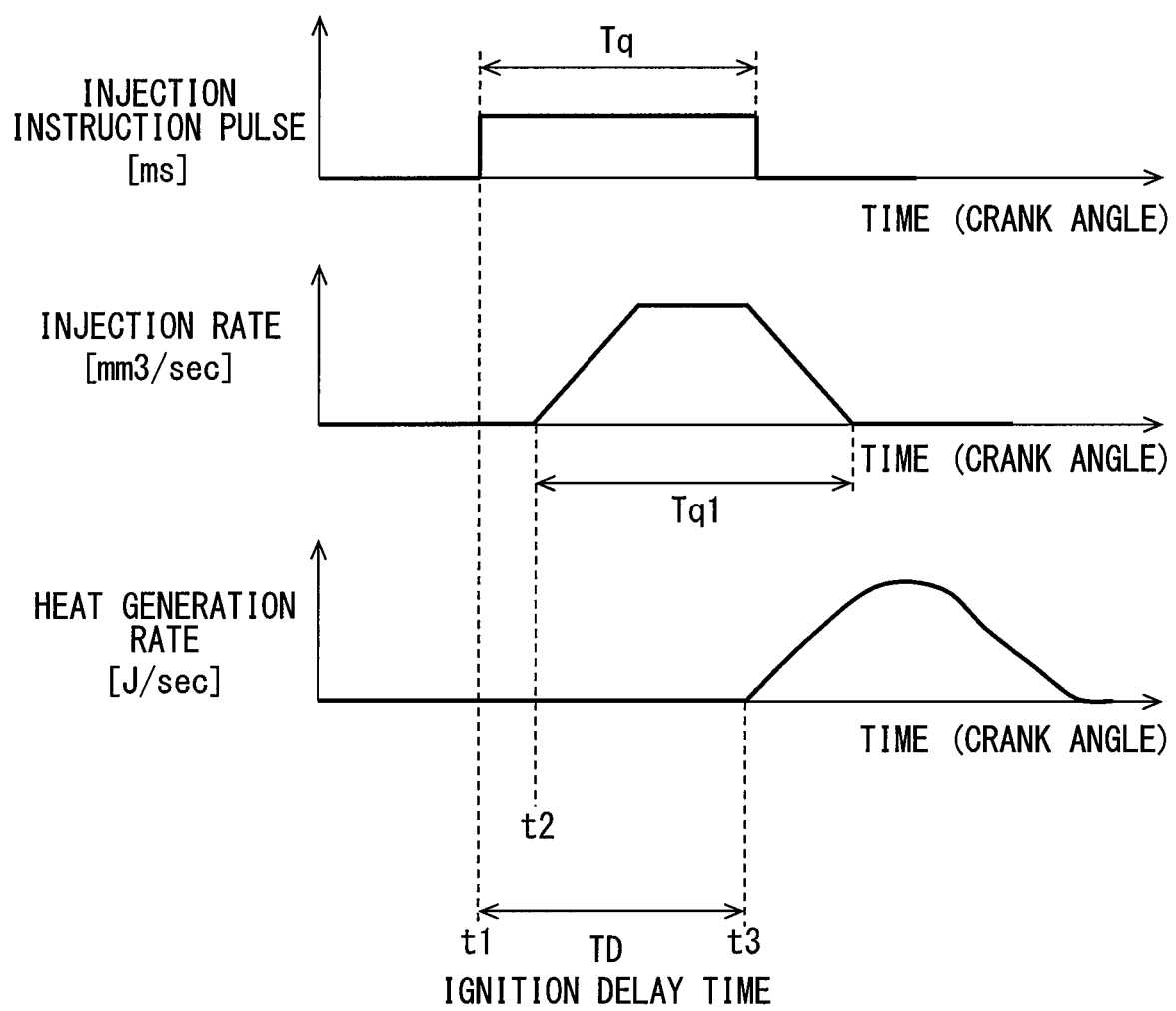
FIG. 2 is an illustrative diagram of an ignition delay characteristic.

The microcomputer 80a also functions as a combustion characteristic acquisition unit 81 that acquires a detection value (combustion characteristic value) of a physical quantity relating to combustion. The combustion characteristic value according to the present embodiment represents an ignition delay time TD shown in FIG. 2. An upper part of FIG. 2 shows a pulse signal output from the microcomputer 80a. Energization of the fuel injection valve 15 is controlled according to the pulse signal. Specifically, the energization is started at a time point t1 when the pulse is on, and the energization continues in a pulse on period Tq. In short, the injection start timing is controlled according to the pulse on timing. In addition, the injection period is controlled according to the pulse on period Tq, and further, the injection amount is controlled. In addition, the ignition delay time TD can be acquired as an ignition timing.

A middle part of FIG. 2 shows a change in an injection state of the fuel from the injection hole, which results from the valve opening operation and the valve closing operation of the valve body according to the pulse signal. Specifically, the middle part of FIG. 2 shows a change in the injection amount (injection rate) of the fuel injected per unit time. As shown in the drawing, there is a time lag from the time point t1, when energization is started, to a time period t2 when the injection is actually started. There is also a time lag from an energization completion time point until the injection is actually stopped. A period Tq1 in which the injection is actually performed is controlled according to a pulse on period Tq.

A lower part of FIG. 2 shows a change in the combustion state of the injected fuel in the combustion chamber 11a. Specifically, the lower part of FIG. 2 shows a change in heat quantity (heat generation rate) per unit time caused by self-ignition combustion of a mixture of the injected fuel with the intake air. As shown in the drawing, there is a time lag from the time point t2 of the injection start to a time point t3 when the combustion actually starts. In the present embodiment, a time from the time point t1, at which the energization starts, to the time point t3, at which the combustion starts, is defined as an ignition delay time TD.

The combustion characteristic acquisition unit 81 estimates the time point t3, when the combustion starts, based on the change in the in-cylinder pressure detected with the in-cylinder pressure sensor 21. Specifically, during a period, in which a crank angle rotates by a predetermined amount, after the piston 13 has reached a top dead center, a timing at which the in-cylinder pressure suddenly rises is estimated as a combustion start timing (time point t3). The ignition delay time TD is calculated by the combustion characteristic acquisition unit 81 based on the estimation result. Further, the combustion characteristic acquisition unit 81 acquires various states (combustion conditions) at the time of combustion for each combustion. Specifically, the in-cylinder pressure, the in-cylinder temperature, the intake oxygen concentration, and the injection pressure are acquired as combustion conditions.

Those combustion conditions are parameters expressing a flammability of the fuel. The air-fuel mixture is more likely to self-ignite and likely to burn as the in-cylinder pressure immediately before the combustion is higher, as the in-cylinder temperature immediately before the combustion is higher, as the intake oxygen concentration is higher, and as the injection pressure is higher. As the in-cylinder pressure and the in-cylinder temperature just before the combustion, for example, a value detected at the time point t1 at which the energization of the fuel injection valve 15 is started may be used. The in-cylinder pressure is detected with the in-cylinder pressure sensor 21. The in-cylinder temperature is detected with the temperature detection element 21a. The intake oxygen concentration is detected with the oxygen concentration sensor 22. The injection pressure is detected with the rail pressure sensor 23. The combustion characteristic acquisition unit 81 stores the acquired ignition delay time TD in the memory 80b in association to the parameters (combustion conditions) related to the combustion.

The microcomputer 80a also functions as a mixing ratio estimation unit 82 to estimate the mixing ratio of the molecular structural species contained in the fuel based on the multiple combustion characteristic values detected under the different combustion conditions. For example, the microcomputer 80a substitutes the ignition delay time TD for each different combustion condition into a determinant shown in FIG. 3 to calculate the mixing amount of the molecular structural species. The microcomputer 80a divides each of the calculated mixing amounts by the total amount, thereby to calculate the mixing ratio of the molecular structural species.

A matrix on the left side of FIG. 3 has x rows and one column and includes x numbers. Those numerical values represent the mixing amounts of various components. The various components are classified according to the type of molecular structure. Types of molecular structure include linear paraffins, side chain paraffins, naphthenes and aromatics.

The matrix on the left side of the right side is x rows and y columns, and has numerical values such as a00 . . . aXY. Those numerical values are constants determined on the basis of tests conducted in advance. The matrix on the right side of the right hand is y row 1 column and has y numbers. Those numerical values are the ignition delay time TD acquired with the combustion characteristic acquisition unit 81. For example, a numerical value of a first row and a first column represents an ignition delay time TD(i) acquired under a combustion condition i set in a predetermined combination of the parameters, and a numerical value of a second row and the first column represents an ignition delay time TD(j) acquired under a combustion condition j. All of the parameters are set to different values between the combustion condition i and the combustion condition j. Symbols P(i), T(i), O2(i) and Pc(i) in FIG. 3 indicate the in-cylinder pressure, the in-cylinder temperature, the intake oxygen concentration, and the injection pressure under the combustion condition i, respectively. Symbols P(j), T(j), O2(j) and Pc(j) indicate the respective parameters under the combustion condition j.

Subsequently, a description will be made on a theory that the mixing amount of the molecular structural species can be calculated by substituting the ignition delay time TD for each combustion condition in the determinant of FIG. 3 with reference to FIGS. 4, 5, and 6.

As shown in FIG. 4, since the air-fuel mixture is more likely to self-ignite as the concentration of oxygen (in-cylinder oxygen concentration) contained in the air-fuel mixture related to the combustion is higher, the ignition delay time TD becomes shorter. Three solid lines (1), (2) and (3) in the drawing are characteristic lines showing the relationship between an in-cylinder oxygen concentration and the ignition delay time TD. However, the characteristic lines vary depending on the fuel. Strictly, the characteristic lines vary depending on the mixing ratio of the respective molecular structural species contained in the fuel. Therefore, by detecting the ignition delay time TD when the in-cylinder oxygen concentration is O2(i), it can be estimated which molecular structural species is targeted. In particular, by comparing the ignition delay time TD in a case where the in-cylinder oxygen concentration is O2(i) with the ignition delay time TD in a case where the in-cylinder oxygen concentration is O2(j), the mixing ratio can be estimated with higher precision.

Similarly, as shown in FIG. 5, since the self-ignition tends to occur more easily as the in-cylinder temperature becomes higher, the ignition delay time TD becomes shorter. Three solid lines (1), (2) and (3) in the drawing are characteristic lines showing a relationship between the in-cylinder temperature and the ignition delay time TD. However, the characteristic lines vary depending on the fuel. Strictly, the characteristic lines vary depending on the mixing ratio of the respective molecular structural species contained in the fuel. Therefore, by detecting the ignition delay time TD when the in-cylinder temperature is B1, it can be estimated which molecular structural species is targeted. In particular, by comparing the ignition delay time TD in a case where the in-cylinder temperature is T(i) with the ignition delay time TD in a case where the in-cylinder temperature is T(j), the mixing ratio can be estimated with higher precision.

Further, the molecular structural species highly influenced by the characteristic line relating to the in-cylinder oxygen concentration (refer to FIG. 4) is different from the molecular structural species highly influenced by the characteristic line relating to the in-cylinder temperature (refer to FIG. 5). As described above, the molecular structural species having a high degree of influence is different according to the characteristic lines relating to the respective multiple combustion conditions. Therefore, based on the combination of the ignition delay times TD obtained by setting the multiple parameters (combustion conditions) to different values, it can be estimated which of the molecular structural species has a high mixing ratio, for example, as shown in FIG. 6.

The molecular structural species A exemplified in FIG. 6 is a molecular structural species having a high degree of influence on the characteristic line (first characteristic line) related to the in-cylinder oxygen concentration (first parameter). In addition, the molecular structural species B is a molecular structural species having a high degree of influence on the characteristic line (second characteristic line) relating to the in-cylinder temperature (second parameter). The molecular structural species C is a molecular structural species having a high degree of influence on the characteristic line (third characteristic line) relating to the third parameter. The molecular structural species A is mixed more, as a change in the ignition delay time TD appears more with respect to a change in the first parameter. In a similar manner, the molecular structural species B are mixed more, as a change in the ignition delay time TD appears more with respect to a change in the second parameter. The molecular structural species B is mixed more, as a change in the ignition delay time TD appears more with respect to a change in the third parameter. Therefore, the mixing ratio of the molecular structural species A, B, C can be estimated for each of the different fuels (1), (2) and (3).

Subsequently, the processing of a program to be executed by the combustion characteristic acquisition unit 81 will be described. The processing is executed each time a pilot injection is commanded.

First, the combustion characteristic acquisition unit 81 estimates the time point t3 of the combustion start based on the detection value of the in-cylinder pressure sensor 21 as described above, and calculates the ignition delay time TD related to the pilot injection. Subsequently, the combustion characteristic acquisition unit 81 stores the ignition delay time TD in association with the multiple parameters (combustion conditions) in the memory 80*b*.

Specifically, a numerical range, in which the respective parameters can be, is divided into multiple regions in advance, and the combinations of regions of the multiple parameters are set in advance. For example, the ignition delay time TD(i) shown in FIG. 3 represents the ignition delay time TD acquired under the combination of the regions of P(i), T(i), O2(i), and Pc(i). Likewise, the ignition delay time TD(j) represents the ignition delay time TD acquired under the combination of the regions of P(j), T(j), O2(j), and Pc(j).

When it is highly likely that another fuel has been mixed with the fuel stored in the fuel tank due to refueling by a user, it is assumed that the mixing ratio of the molecular structural species has changed and an estimated value of the mixing amount is reset. For example, the estimated value of the mixing amount is reset when an increase in the remaining fuel level is detected by a sensor that detects the remaining fuel level in the fuel tank at the time of stopping the operation of the internal combustion engine 10.

The combustion characteristic acquisition unit 81 substitutes the ignition delay time TD into the determinant of FIG. 3 to calculate the mixing amount for each molecular structural species. The combustion characteristic acquisition unit 81 changes the number of columns of the matrix representing the constant according to the sampling number, that is, the number of rows of the matrix on the right side of the right member of the determinant. Alternatively, the combustion characteristic acquisition unit 81 substitutes a preset nominal value into the matrix of the ignition delay time TD with respect to the ignition delay time TD that has not been acquired. The combustion characteristic acquisition unit 81 calculates the mixing ratio for each molecular structural species based on the mixing amount, which is calculated in this manner for each molecular structural species.

As described above, the microcomputer 80*a* also functions as the injection control unit 83, the fuel pressure control unit 84, the EGR control unit 85, the supercharging pressure control unit 86, and the intake manifold temperature control unit 87. Those control units set target values on the basis of an engine speed, an engine load, an engine coolant temperature and the like and perform a feedback control so that a control target has a target value. Alternatively, those control units performs an open control according to contents corresponding to the target value.

The injection control unit 83 sets the pulse signal of FIG. 2 so that the injection start timing, the injection amount, and the injection stage number become the target values, thereby to control (injection control) the injection start timing, the injection amount, and the injection stage number. The number of injection stages is the number of injections pertaining to the multistage injection described above. Specifically, the injection control unit 83 stores an ON time (energization time) and a pulse ON rise timing (energization start timing) of the pulse signal corresponding to the target value on a map in advance. The injection control unit 83 acquires the energization time and energization start timing corresponding to the target value from the map and sets a pulse signal.

In addition, the injection control unit 83 stores the output torque generated by the injection, emission state values such as the NOx amount and the PM amount in advance. In setting the target value based on the engine speed, the engine load and the like in next and subsequent injections, the injection control unit 83 corrects the target value based on the values stored as described above. In short, the injection control unit 83 corrects the target value so as to make a deviation between the actual output torque or emission state value, and the desired output torque or emission state value zero, and performs the feedback control.

The fuel pressure control unit 84 controls the operation of a metering valve that controls a flow rate of the fuel drawn into the fuel pump 15*p*. More specifically, the fuel pressure control unit 84 feedback controls the operation of the metering valve based on the deviation between the actual rail pressure detected with the rail pressure sensor 23 and the target pressure Ptrg (target value). As a result, the discharge amount per unit time by the fuel pump 15*p* is controlled, and the actual rail pressure is kept at the target value under the control (fuel pressure control).

The EGR control unit 85 sets a target value of the EGR amount based on the engine speed, the engine load, and the like. The EGR control unit 85 controls the EGR amount while controlling (EGR control) the valve opening degree of the EGR valve 17*a* based on the target value. The supercharging pressure control unit 86 sets a target value of the supercharging pressure based on the engine speed, the engine load, and the like. The supercharging pressure control unit 86 controls the supercharging pressure while controlling (supercharging pressure control) the operation of the supercharging pressure regulator 26 based on the above target value. The intake manifold temperature control unit 87 sets a target value of the intake manifold temperature based on the outside air temperature, the engine speed, the engine load, and the like. The intake manifold temperature control unit 87 controls the intake manifold temperature while controlling (intake manifold temperature control) the valve opening degree of the temperature control valve 17*d* based on the above target value.

The microcomputer 80a functions as the injection control unit 83 thereby to execute a pilot control processing that performs a control for the pilot injection. Herein, the pilot control processing will be described with reference to the flowchart of FIG. 7. The above process is repeatedly executed in a predetermined cycle during the operation period of the internal combustion engine 10.

Figure 7:
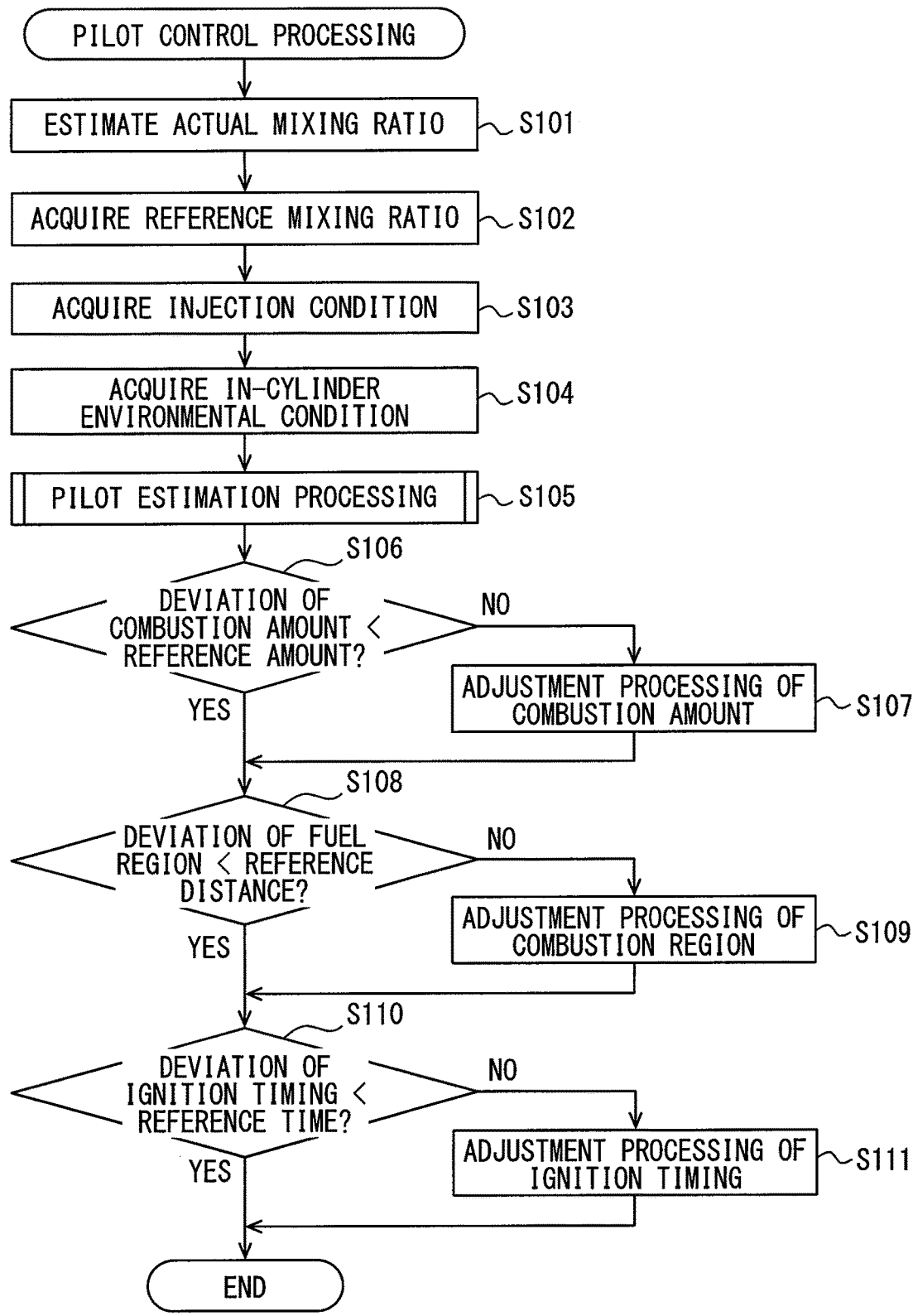
FIG. 7 is a flowchart showing a procedure of pilot control processing.

First, in step S101 of FIG. 7, the mixing ratio (an actual mixing ratio) estimated with the mixing ratio estimation unit 82 is acquired. In other words, the mixing ratio for each molecular structural species shown on the left side of FIG. 3 is acquired. On the other hand, a reference value (reference mixing ratio) of the mixing ratio for each molecular structural species is set in advance and stored in the memory 80b. Those reference mixing ratios are set in consideration of the fuel that is distributed in countries or regions where the vehicle device is used. At the present step S1010, grouped molecular structural species, such as linear paraffins, side chain paraffins, naphthenes, and aromatics, are estimated. Step S101 corresponds to a mixing acquisition unit. In step S102, the reference mixing ratio is read from the memory 80b and acquired.

In step S103, an injection condition on the pilot injection is acquired. Examples of the injection conditions include a rail pressure, which is a fuel pressure in the common rail 15c, a target injection amount, which is a target value of the injection amount, an energization period for the fuel injection valve 15, a needle lift amount of the fuel injection valve 15, and the like. The rail pressure is an injection pressure under the combustion condition.

At step S104, in-cylinder environmental conditions when the pilot injection is performed are acquired. Examples of the in-cylinder environmental conditions include the in-cylinder temperature, which is the temperature of the combustion chamber 11a, the in-cylinder oxygen concentration, which is the oxygen concentration of the combustion chamber 11a, the in-cylinder flow rate, which is the flow rate of the air-fuel mixture in the combustion chamber 11a. The in-cylinder temperature is also included in the combustion conditions. Further, the in-cylinder oxygen concentration is acquired based on the intake oxygen concentration included in the combustion conditions.

In step S105, the pilot estimation processing is executed. The pilot estimation processing will be described referring to the flowchart of FIG. 8. The combustion of the fuel performed by the pilot injection is referred to as a pilot combustion, and a state of the pilot combustion is referred to as a pilot combustion state. Even in a case where a fuel has the same property (for example, the cetane number), when the mixing ratio of the molecular structural species contained in the fuel differs, the pilot combustion state differs. In the pilot estimation processing, a state of the pilot combustion or the pilot injection is estimated, and a state of the pilot combustion gas generated by the pilot combustion in the combustion chamber 11a is estimated based on the estimation result.

Figure 8:
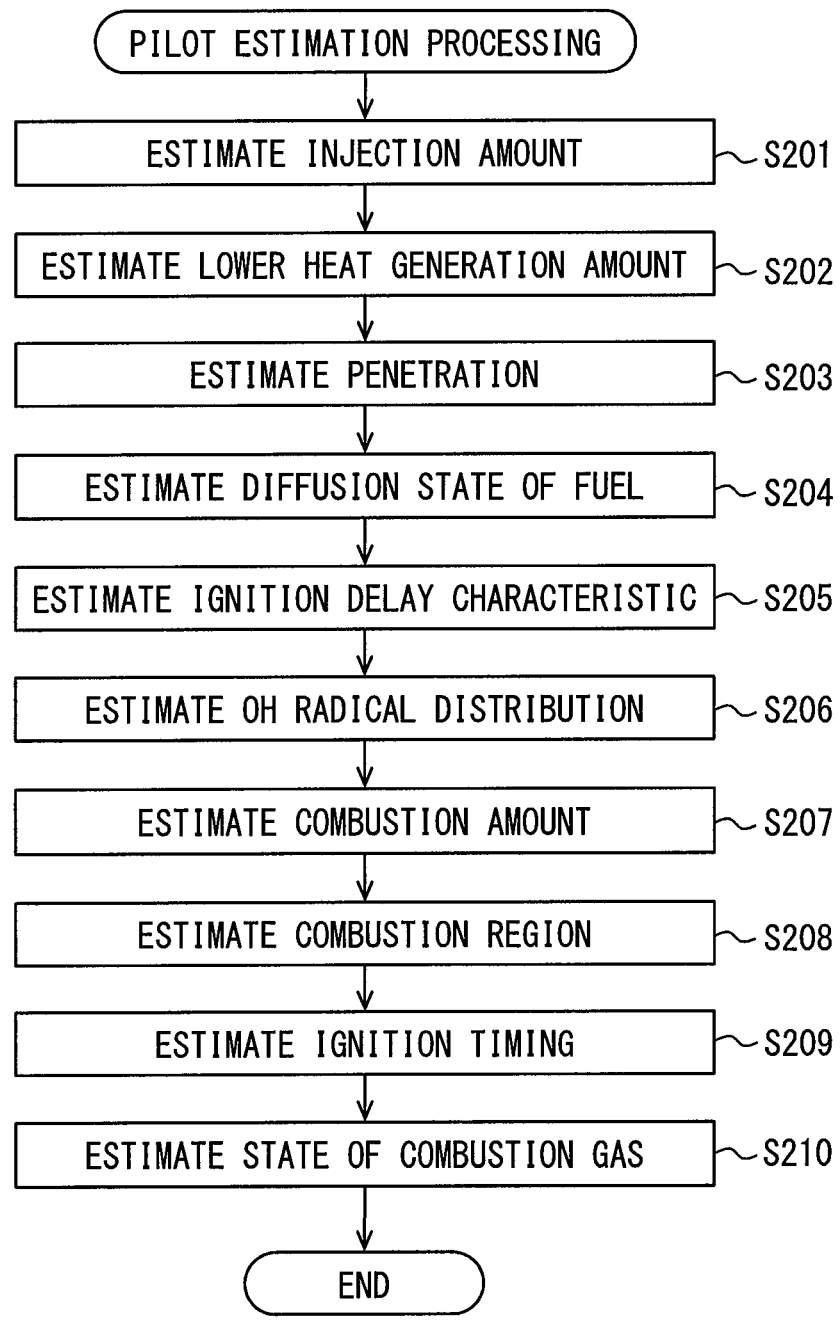
FIG. 8 is a flowchart showing a procedure of pilot estimation processing.

In FIG. 8, in steps S201 to S205, the injection state of the pilot injection is estimated according to the actual mixing ratio of the molecular structural species acquired in step S101. The injection parameter, which represents the injection state of the pilot injection, includes the injection amount, the lower heat generation amount, the penetration, the diffusion state, the ignition delay characteristic, and an OH radical distribution. For the reference fuel having the reference mixing ratio, the values of the respective injection parameters corresponding to the in-cylinder environment are acquired in advance by conducting an experiment or the like, and those acquired data are stored in the memory 80b as reference data. For the actual fuel having the actual mixing ratio, the value of each injection parameter is estimated with comparison with the reference data.

Figure 9:
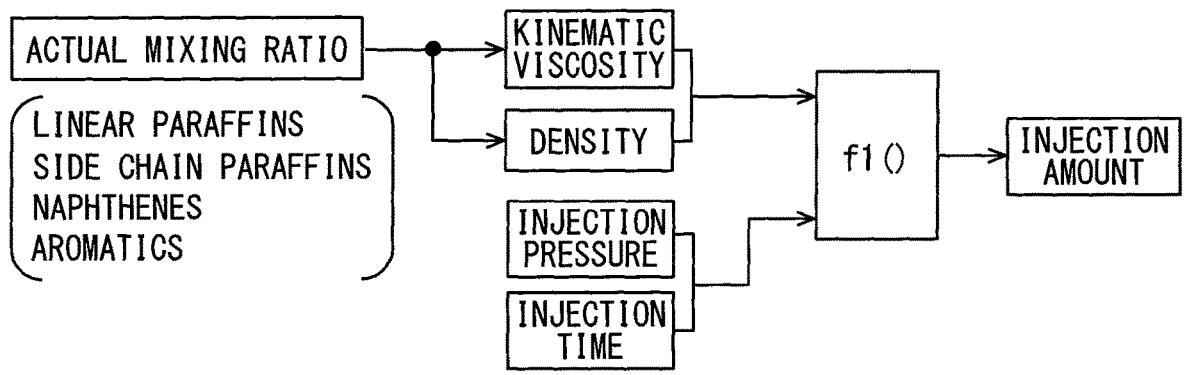
FIG. 9 is a diagram illustrating estimation of an injection amount as an injection parameter.

In step S201, the injection amount of the pilot injection is estimated based on the actual mixing ratio. In this example, as shown in FIG. 9, a kinematic viscosity and a density among the general properties of the fuel are estimated on the basis of the actual mixing ratio, and the injection amount is estimated with the use of a predetermined function f1( ) for the kinematic viscosity and the density as well as the injection pressure and the injection period of the injection conditions. In that case, the kinematic viscosity and the density are parts of the fuel characteristics, which are chemically affected, and the injection pressure and the injection period are parts of the use conditions and the environmental conditions, which are physically affected. Further, in the estimation of the injection amount, an estimation model such as a multiple regression model or a map may be used in place of the function f1 ( ). Furthermore, the pulse on period Tq may be used as the injection period. Step S201 corresponds to an injection amount estimation unit.

Figure 10:
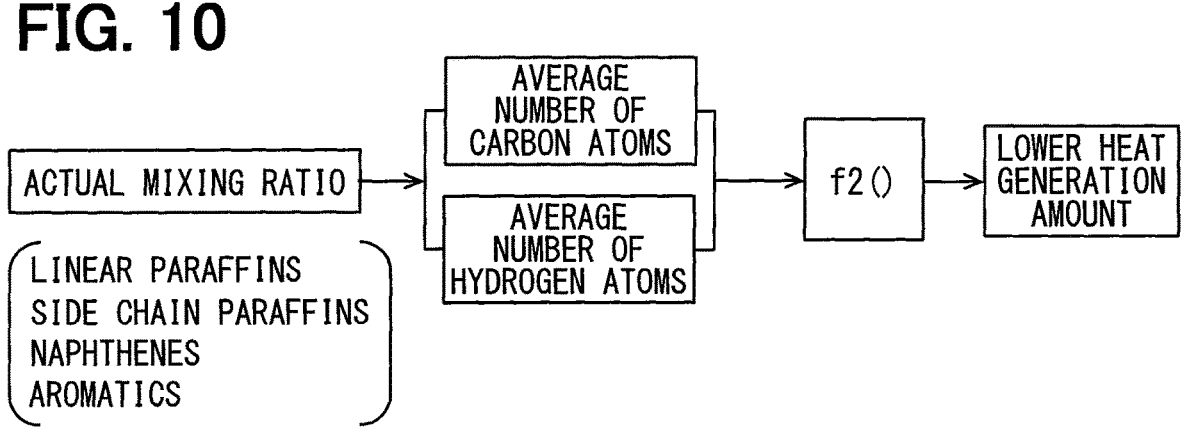
FIG. 10 is a diagram illustrating estimation of a lower heat generation amount as the injection parameter.

In step S202, the lower heat generation amount of the actual fuel is estimated based on the actual mixing ratio. In this example, as shown in FIG. 10, an average number of carbon atoms and an average number of hydrogen atoms of the actual fuel are estimated based on an actual mixing ratio, and the lower heat generation amount is estimated with the use of a predetermined function f2( ) for the average number of carbon atoms and the average number of hydrogen atoms. In this case, the average number of carbon atoms and the average number of hydrogen atoms are determined according to the fuel characteristics which are chemically affected. When the lower heat generation amount is estimated, an estimation model, a map, or the like may be used instead of the function f2( ). Incidentally, step S202 corresponds to a heat generation amount estimation unit.

In step S203, the penetration of the fuel injected by the pilot injection is estimated according to the actual mixing ratio. The penetration is a penetration force indicating a force by which the fuel injected from the fuel injection valve 15 goes straight through the combustion chamber 11a. The penetration of the injected fuel tends to decrease more, as an evaporation amount in the combustion chamber 11a increases more. Therefore, by estimating the volatility of the fuel based on the multiple distillation characteristics, the penetration of the fuel is estimated. Step S203 corresponds to a penetration force estimation unit.

Figure 11:
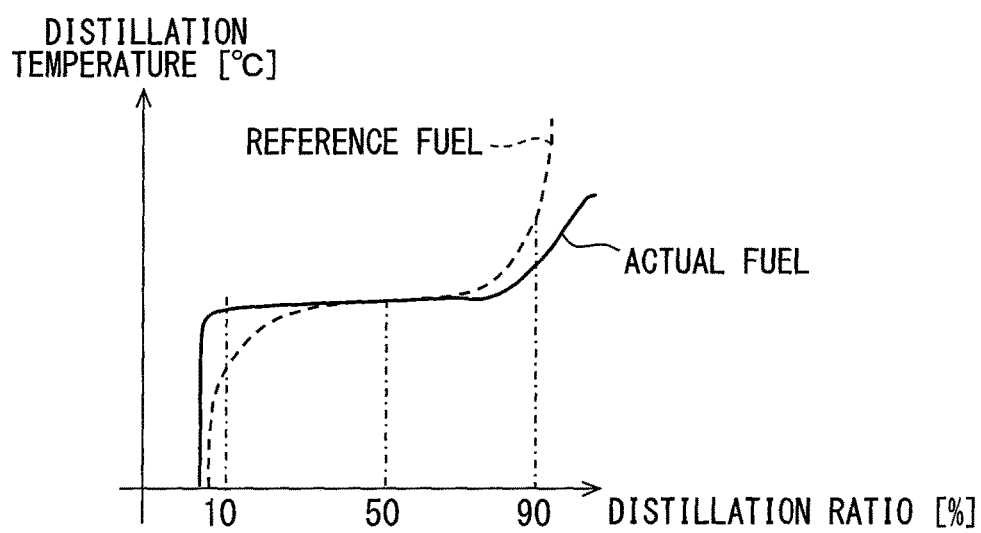
FIG. 11 is a diagram illustrating distillation characteristics.

As shown in FIG. 11, in the comparison between a reference fuel at a reference mixing ratio and an actual fuel at an actual mixing ratio, even in a case where the distillation characteristics T50, at which evaporating by 50%, are the same between the reference fuel and the actual fuel, the distillation characteristics T10 and T90 may be different between the reference fuel and the actual fuel. In that case, by estimating the penetration of the fuel based on the multiple distillation characteristics, the estimation precision can be increased. In addition, the distillation characteristics T50 per se may be different greatly between the reference fuel and the actual fuel. For that reason, by comparing and estimating the distillation characteristics T50, which are the average distillation characteristics, according to the average number of carbon atoms for fuel, the precision of the penetration can be enhanced.

In the fuel diffused in the combustion chamber 11a by being injected, a momentum becomes larger, as a mass of particles is larger, and the penetration tends to increase. In this case, the fuel having a higher kinematic viscosity and being less likely to be atomized tends to have a larger fuel density in spray, and the mass of the particles tends to increase. In particular, a shear force of the fuel to an air, an injection speed of the fuel in the injection hole, a density of the fuel, and the like are susceptible to the kinematic viscosity and the viscosity. In addition, the shear force of the fuel is susceptible to the in-cylinder pressure, and the shear force of the fuel tends to become higher, as the in-cylinder pressure is higher. In the fuel, the particles lose their mass more, as the volatility is higher, and the momentum becomes smaller. For example, a fuel at a low temperature from an initial boiling point of the distillation characteristics to a temperature T50 relatively trends to vaporize, and the penetration tends to be small.

In step S203, as shown in FIG. 12, the penetration is estimated based on the fuel characteristics including the density, the kinematic viscosity, and the multiple distillation characteristics, the in-cylinder environment including the in-cylinder temperature and the in-cylinder flow rate, and the injection amount estimated in step S201. The penetration is influenced by the in-cylinder environmental conditions and the injection conditions, and can be estimated with a mathematical formula as shown in FIG. 13. In the formula, penetration P1, P2, P3 . . . according to the in-cylinder environmental conditions and the injection conditions are estimated based on a predetermined constant b and the fuel characteristics such as the kinematic viscosity. The constant b includes x rows and y columns and is, for example, a matrix having numerical values b00 . . . bXY.

It is possible to estimate a provisional penetration based on the actual mixing ratio and to correct the provisional penetration with the injection amount, thereby to estimate the penetration.

The distillation characteristics are estimated based on the actual mixing ratio contained in the fuel. For that reason, the fuel characteristics also include a factor of the actual mixing ratio in addition to general characteristics such as the density, the kinematic viscosity and the distillation characteristics.

Returning to FIG. 8, in step S204, the diffusion state of the fuel injected by the pilot injection is estimated based on the actual mixing ratio. The diffusion state is a degree of diffusion indicating how much the injected fuel diffuses. The injected fuel is likely to diffuse, as the evaporation amount in the combustion chamber 11a further increases. Therefore, as with the penetration, the volatility of the combustion is estimated based on the multiple distillation characteristics to estimate the diffusion state of the fuel. Incidentally, step S204 corresponds to a diffusion estimation unit.

In step S204, as shown in FIG. 14, the diffusion state is estimated based on the fuel characteristics including the density, the kinematic viscosity, and the multiple distillation characteristics, the in-cylinder environment including the in-cylinder temperature and the in-cylinder flow rate, and the injection amount estimated in step S201. The diffusion state is influenced by the in-cylinder environmental conditions and the injection conditions, and can be estimated with a mathematical formula as shown in FIG. 15. In the formula, diffusion states D1, D2, D3 . . . according to the in-cylinder environmental conditions and the injection conditions are estimated based on a predetermined constant c and the fuel characteristics such as the kinematic viscosity. The constant c includes x rows and y columns, and is, for example, a matrix having numerical values c00 . . . cXY.

The diffusion state can also be calculated with the use of a well-known mathematical formula showing the momentum theory of spraying.

In step S205, the ignition delay characteristic of the actual fuel is estimated based on the actual mixing ratio. The ignition delay characteristic is a characteristic indicating tendency of the ignition. For example, the ignition delay characteristic is expressed by a time required for the ignition of the fuel to start in a state where the in-cylinder environment promotes the ignition. Examples of a state in which the in-cylinder environment promotes the ignition include a state in which the in-cylinder temperature and the in-cylinder pressure are sufficiently high for generation of the ignition, and the like. Step S205 corresponds to an ignition delay estimation unit.

In step S206, the OH radical distribution is estimated based on the injection amount, the lower heat generation amount, the penetration, the diffusion state, the actual mixing ratio, the in-cylinder temperature, and the in-cylinder oxygen concentration. The OH radical distribution represents a generating state of the OH radical in the combustion chamber 11a, and is for example, a density, an amount, a position, of the OH radical, and the like. The position of the OH radical includes a gravity position of a region where the OH radical causes and a causing initial position. As shown in FIG. 16, the OH radical distribution is estimated by using a predetermined function f3 ( ) on, for example, the injection amount, the lower heat generation amount, the penetration, the diffusion state, and the actual mixing ratio. In addition, f3 ( ) includes a physical condition relating to an atmosphere such as the in-cylinder temperature and the in-cylinder oxygen concentration. When the OH radical distribution is estimated for the pilot injection, an amount, a density, and a position is estimated for a distribution of a combustion of combustible molecules such as a ketone, an aldehyde, and the like.

A provisional OH radical distribution may be estimated based on the injection amount, the lower heat generation amount, the penetration, and the diffusion state, and the provisional OH radical distribution may be corrected by the actual mixing ratio. Step S206 corresponds to an OH radical estimation unit. Alternatively, the OH radical distribution may be estimated based on the injection pressure in addition to the actual mixing ratio, the in-cylinder temperature, and the in-cylinder oxygen concentration.

In this example, the pilot injection performed while the in-cylinder temperature is rising, the main injection, the after-injection, and the post injection performed while the in-cylinder temperature is decreasing are performed in the stated order in one combustion cycle. The in-cylinder oxygen concentration is largest at a timing when the pilot injection is performed, decreases in the order of the main injection and the after-injection, and is smallest at a timing when the post injection is performed.

The in-cylinder temperature is lowest at a timing when the pilot injection is performed after intake starts, and rises to a sufficiently high temperature at a timing when the main injection and the after-injection are performed. Thereafter, the in-cylinder temperature decreases with an increase in a cylinder capacity in an expansion stroke of the piston, and becomes an intermediate temperature higher than the temperature at the timing when the pilot injection is performed, at the timing when the post injection is performed. In the combustion chamber 11a, for example, a low temperature range is set to 900K or lower, a medium temperature range is set to 900K to 1100K, and a high temperature range is set to 1100K or higher.

In one combustion cycle, chemical combustion is started by oxidation of combustible molecules such as ketone and aldehyde, with the generation of the OH radicals caused by the injection of the fuel. Examples of reactions for generating the OH radicals include a decomposition reaction, in which hydrogen peroxide $H_2O_2$ produced from inert $HO_2$ radicals and alkene is decomposed into the OH radicals, and a chain branching reaction in which the generation and consumption of the OH radicals are repeated in a process where oxygen is given to hydrocarbons to produce combustible molecules. In the chain branching reaction, the generation amount and the consumption amount of the OH radicals are almost identical with each other. Estimation of the components contributing to the OH radicals is synonymous with the estimation of the generation amount of the combustible molecules.

Each molecular structural species of the fuel contains a produced molecule that is likely to produce the OH radicals in a process of a chain branching reaction and an inhibitor molecule that is unlikely to produce the OH radicals. The produced molecules include linear paraffins, and inhibitor molecules include aromatics. In the fuel, in not only the chain branching reaction but also any reactions, the ease of ignition varies depending on the density distribution between the produced molecule and the inhibitor molecule. However, when the decomposition of $H_2O_2$ is excessive in the high temperature range, the ignition timing varies depending on the generation state of the OH radicals and fluid turbulence inside and outside the spray. The density distribution between the produced molecule and the inhibitor molecule affects the generation position of the OH radical distribution produced by the chain branching reaction along a time series, and the mode of occurrence of the chain branching reaction is correlated with the fuel component.

Ease of ignition caused by the injection of the fuel varies depending on which temperature range, to which the in-cylinder temperature belongs at that time. As shown in FIG. 17, in the low temperature range where the in-cylinder temperature is 900K or lower, $H_2O_2$ is hardly decomposed, and the generation amount of the OH radical caused by the decomposition reaction of $H_2O_2$ is very small. On the other hand, among the fuel components, the chain branching reactions caused by the components capable of extracting hydrogen by intramolecular isomerization and having a structure with a small strain energy are likely to occur, and the generation amount of the OH radicals involved in the chain branching reaction is relatively increased. In that case, a large number of produced molecules tend to cause the chain branching reaction, and the decomposition reaction of $H_2O_2$ hardly occurs.

To this issue, the inventors have acquired knowledge that the degree of dependence of the ignition timing on the fuel component is high in the low temperature range which is the temperature range where the pilot injection is performed. In this case, as compared with a case, in which $H_2O_2$ is forcibly decomposed into combustible molecules such as ketone and aldehyde with 1 to 3 carbon atoms (C1 to C3) due to the OH radical production and β cleavage accompanying the decomposition of $H_2O_2$ at the high temperature to perform ignition, the ignition delay tends to occur depending on the actual mixing ratio.

As the in-cylinder temperature rises from the low temperature range, the amount of OH radicals generated by the chain branching reaction gradually decreases, and the amount of OH radicals produced by the decomposition reaction of $H_2O_2$ abruptly increases.

For example, in the medium temperature range where the in-cylinder temperature is 900K to 1100K, although $H_2O_2$ tends to be decomposed, the amount of OH radicals generated by the decomposition reaction of $H_2O_2$ does not increase sharply even though the temperature rises. In that case, the amount of OH radicals produced by the decomposition reaction of $H_2O_2$ is larger than the OH radicals generated by the chain branching reaction by the fuel component. Before a structure with small strain energy causing the chain branching reaction is formed, the number of molecules having a number of carbon atoms of 1 to 3 increases, and the chain branching reaction gradually decreases.

To this issue, the present inventors have acquired knowledge that an ignition delay, which depends on molecules produced as a fuel component causing the chain branching reaction, and an ignition delay, which is caused by the decomposition reaction of $H_2O_2$ having no sensitivity in a fuel component such as the produced molecule, are required to be taken into consideration for the ignition timing in the medium temperature range which is a temperature range where the post injection is performed. For that reason, in the medium temperature range, the dependence of the ignition timing on the fuel component is lower than that in the low temperature range where the pilot injection is performed, and the post injection is less likely to cause the ignition delay than the pilot injection depending on the actual mixing ratio.

Also, in a high temperature range where the in-cylinder temperature is 1100K or higher, $H_2O_2$ is likely to decompose, and the amount of OH radicals generated by the decomposition reaction of $H_2O_2$ abruptly increases as the temperature rises. On the other hand, the number of molecules causing the chain branching reaction by the fuel component decreases, and the amount of OH radicals generated by the chain branching reaction is very small. To this issue, the present inventors have acquired knowledge that the ignition timing is hardly influenced by the chemical combustion of the fuel in the high temperature range where the main injection and the after-injection are performed. For that reason, depending on the actual mixing ratio, the main injection and the after-injection are less likely to cause the ignition delay than the post injection.

Returning to FIG. 8, in steps S207 to S209, the combustion state of the fuel injected by the pilot injection is estimated by using each injection parameter estimated in steps S201 to S206. The combustion parameters indicating the combustion state include three parameters including a combustion amount, a combustion region, and an ignition timing. In the reference fuel, the values of the respective combustion parameters corresponding to the in-cylinder environment are acquired in advance by conducting an experiment or the like, and as with the injection parameters, those acquired data are stored in the memory 80b as the reference data. The actual fuel is compared with reference data to estimate a value of each combustion parameter.

In step S207, the amount of the combustion caused by the pilot injection is estimated. In the estimation of the combustion amount, all of the six injection parameters including the injection amount, the lower heat generation amount, the penetration, the diffusion state, the ignition delay characteristic are used. For example, the combustion amount is calculated with the use of a mathematical formula shown in FIG. 18. In the formula, Qburn represents the combustion amount, A represents the combustion rate, ρ×Qinj represents the injection amount and A represents the lower heat generation amount. As shown in FIG. 19, the combustion rate α is estimated with the use of a predetermined function f4( )

for the penetration estimated in step S203, the diffusion state estimated in step S204, the OH radical distribution estimated in step S205, and the ignition delay characteristic estimated in step S205. In addition, a spray volume of the pilot injection is estimated by using the penetration and the diffusion state. Step S207 corresponds to a combustion amount estimation unit.

In step S208, the combustion region caused by the pilot injection is estimated. Estimation of the combustion region uses five of the six injection parameters including the injection amount, the penetration, the diffusion state, the ignition delay characteristic, and the OH radical distribution. For example, the combustion region is estimated by using predetermined functions, maps, models, or the like on the injection amount, the penetration, the diffusion state, the ignition timing, and the OH radical distribution. Step S208 corresponds to a region estimation unit.

In step S209, the ignition timing caused by the pilot injection is estimated. Estimation of the ignition timing uses four of the six injection parameters including the injection amount, the diffusion state, the ignition delay characteristic, and the OH radical. For example, the ignition timing is estimated by using predetermined functions, maps, models, or the like on the injection amount, the diffusion state, the ignition delay characteristic, and the OH radical. Step S209 corresponds to a timing estimation unit.

In step S210, the state of the combustion gas caused by the pilot combustion is estimated by using each combustion parameter estimated in steps S206 to S208. In this case, the temperature of the combustion gas is estimated based on the combustion amount among three combustion parameters, the position of the combustion gas is estimated based on the combustion region among the three combustion parameters, and the causing timing of the combustion gas is estimated based on the ignition timing among the three combustion parameters.

Figure 20:
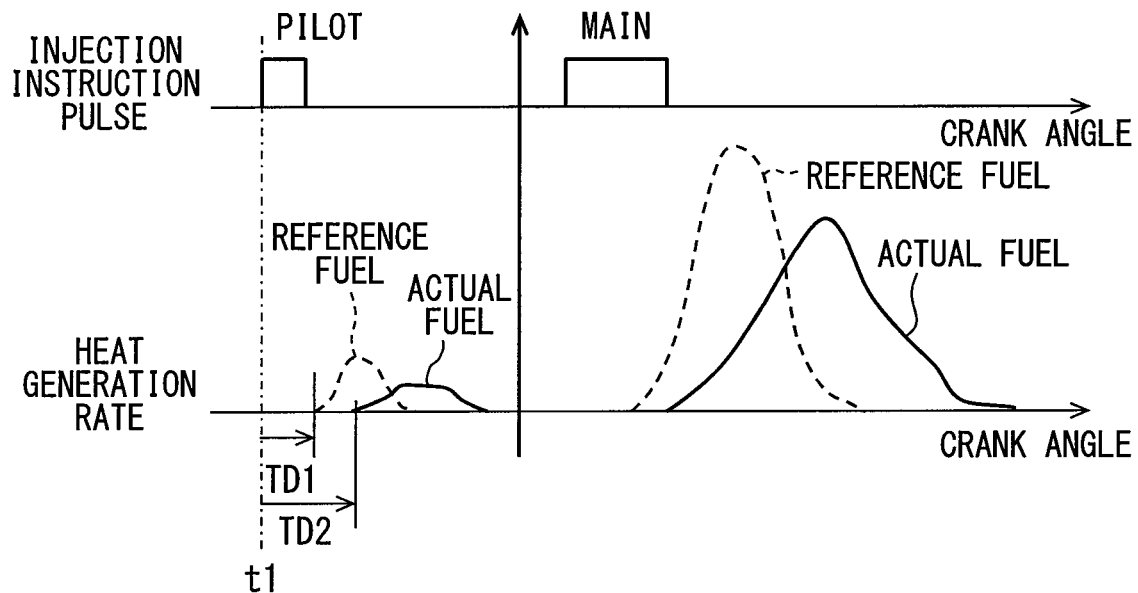
FIG. 20 is a diagram illustrating a generation timing of a combustion gas.

For example, as shown in FIG. 20, when an ignition delay time TD2 that is the ignition timing of the actual fuel is longer than an ignition delay time TD1 of the reference fuel, the causing timing of the combustion gas caused by the pilot combustion for the actual fuel is later than that for the reference fuel. In this case, since a timing that the temperature of the combustion gas reaches a temperature appropriate to the ignition caused by the main injection becomes delayed, it is concerned that a stability of the ignition caused by the main injection decreases. When the ignition delay time TD1 of the actual fuel is greater than the ignition delay time TD2 of the reference fuel in the pilot injection, it is assumed that the ignition delay time becomes greater even in a case where the main injection is performed by the actual fuel. In this case, the ignition delay times becomes greater in both the pilot injection and the main injection, it is possible that a misfire occurs without performing the ignition appropriately with the main injection.

Figure 21:
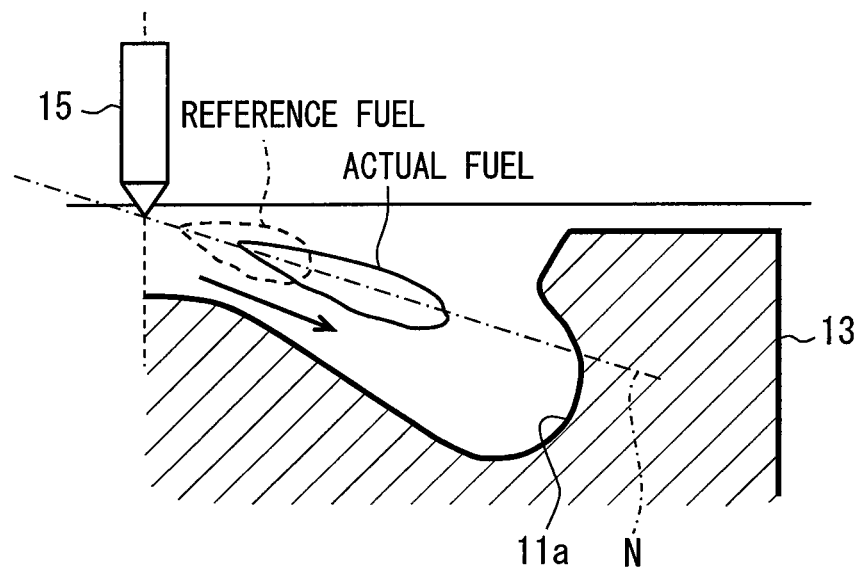
FIG. 21 is a diagram illustrating a position of the combustion gas.

As shown in FIG. 21, in a vertical direction of an injection direction N of the fuel injected from the fuel injection valve 15, when the actual fuel diffuses more widely than the reference fuel does for the combustion region, the actual fuel also diffuses more widely than the reference fuel does for the combustion gas. In this case, when the volatility of the fuel injected by the main injection is high and the fuel diffuses in a wide range, it is assumed that the fuel in an outer periphery of the spray is rarefied relative to the oxygen, and a period until the fuel becomes in the ignition state is likely to be lengthened. In the injection direction N, when the penetration of the actual fuel extends more than that of the reference fuel for the combustion region, it is assumed that the fuel includes molecular structural species with heavy mass and high kinematic viscosity and the fuel is less likely to ignite, and the period until the fuel becomes in the ignition state is likely to be lengthened. Thus, it is concerned that the stability of the ignition caused by the main injection decreases, for the actual fuel where the combustion region is likely to diffuse and the penetration does not extend. Likewise, it is concerned that the stability of the ignition caused by the main injection decreases, for the actual fuel where the combustion region is less likely to diffuse and the penetration extends.

Since a local temperature in the vicinity of the injection hole increases when the injection fuel does not diffuse in the pilot combustion region, an environment that the main spray is likely to ignite can be produced. In contrast, when the fuel that does not diffuse in the pilot combustion region is used, it is assumed that the fuel includes molecular structural species with heavy mass and high kinematic viscosity, and the ignition ability of the main spray decreases even though the pilot combustion region is arranged in the vicinity of the injection hole.

Returning to FIG. 7, after the pilot estimation processing, in step S106, the combustion amount of the reference fuel is read from the memory 80b, and a "deviation" between the combustion amount of the reference fuel and the combustion amount of the actual fuel is calculated as a difference. Thus, it is determined whether the difference is smaller than a reference amount that is previously set or not. The difference in this case is an absolute value of the difference between the combustion amount of the reference fuel and the combustion amount of the actual fuel.

In this case, the target value of the combustion parameter including the combustion amount and the like caused by the pilot injection is set according to the operation state of the internal combustion engine 10, and the determination reference of the difference is set according to the target value of the combustion parameter. For example, when a depression quantity of the accelerator pedal by a driver increases, the target value of the combustion parameter is set such that the internal combustion engine 10 increases its output power.

When the difference in the combustion amount is not smaller than the reference amount, the process proceeds to step S107, and a process of adjusting the combustion amount is performed so that the difference becomes smaller than the reference amount. In this example, when the combustion amount of the actual fuel is smaller than the combustion amount of the reference fuel, an increasing process for increasing the combustion amount is performed, and when the combustion amount of the actual fuel is larger than the combustion amount of the reference fuel, a decreasing process for decreasing the combustion amount is performed. As for the increasing process, processing to increase the injection amount, processing to increase the injection pressure, processing to adjust the injection timing toward a top dead center TDC of the piston 13, and processing to decrease the EGR amount can be taken. As for the decreasing process, processing to decrease the injection amount, processing to decrease the injection pressure, processing to adjust the injection timing toward the bottom dead center BDC of the piston 13, and processing to increase the EGR amount can be taken.

In the process of adjusting the combustion amount, the target value, which is for reducing the difference of the combustion amount to be smaller than the reference amount, is set based on the actual mixing ratio. In that case, a provisional target value is acquired based on the reference mixing ratio, and the provisional target value is corrected with the use of the actual mixing ratio to calculate the target value. For example, in the process of increasing the injection amount, the target value of the injection amount is acquired with the use of the reference mixing ratio, and based on a difference between the combustion amount and the reference amount, and the provisional target value is corrected based on the actual mixing ratio to calculate the target value. As a result, the issue that the injection amount is insufficient due to the actual mixing ratio although the process of increasing the injection amount has been performed is restricted.

When the difference in the combustion amount is smaller than the reference amount, it is determined that the process of adjusting the combustion amount is unnecessary, and the process proceeds directly to step S108.

In step S108, the combustion region of the reference fuel is read from the memory 80b, a "deviation" between the combustion region of the reference fuel and the combustion region of the actual fuel is calculated as a difference, and it is determined whether the difference is smaller than a predetermined reference distance, or not. The difference in that case represents an absolute value of a separation distance between a tip of the combustion region of the reference fuel and a tip of the combustion region of the actual fuel in an extending direction of the injection hole of the fuel injection valve 15.

When the difference in the combustion region is not smaller than the reference distance, the process proceeds to step S109, and a process of adjusting the combustion region is performed so that the difference becomes smaller than the reference distance. In this example, when the tip of the combustion region of the actual fuel is located at a position farther from the tip of the fuel region of the reference fuel with respect to the injection hole as a reference, an approach process is performed to bring the tip of the combustion region of the actual fuel close to the injection hole. In addition, when the tip of the combustion region of the actual fuel is located at a position closer to the tip of the combustion region of the reference fuel relative to the injection hole as the reference, a separation process is performed to move the tip of the combustion region of the actual fuel away from the injection hole. As for the approach process, processing to increase the injection stages of the pilot injection, and processing to adjust the injection timing toward the TDC can be taken. As for the separation process, processing to decrease the injection stages of the pilot injection, and processing to adjust the injection timing toward the BDC can be taken. In the configuration, in which a glow plug is provided in the combustion chamber 11a, a heating operation of the air-fuel mixture by the glow plug may be performed as the approach process.

In the process of adjusting the combustion region, the target value for reducing the difference of the combustion region to be smaller than the reference distance is set based on the actual mixing ratio. In that case, as in the process of adjusting the combustion amount, a provisional target value is acquired based on the reference mixing ratio, and the provisional target value is corrected with the use of the actual mixing ratio to calculate the target value.

When the difference in the combustion region is smaller than the reference distance, it is determined that the process of adjusting the combustion region is unnecessary, and the process proceeds directly to step S110.

In step S110, the ignition timing of the reference fuel is read from the memory 80b, a "deviation" between the ignition timing of the reference fuel and the ignition timing of the actual fuel is calculated as a difference, and it is determined whether the difference is smaller than a predetermined reference time, or not. The difference in this case is an absolute value of the difference between the ignition timing of the reference fuel and the ignition timing of the actual fuel.

When the difference in ignition timing is not smaller than the reference time, the process proceeds to step S111, and a process of adjusting the ignition timing is performed so that the difference becomes smaller than the reference time. In this case, when the ignition timing of the actual fuel is later than the ignition timing of the reference fuel, an accelerating process for accelerating the ignition timing is performed, and when the ignition timing of the actual fuel is earlier than the ignition timing of the reference fuel, a delaying process for delaying the ignition timing is performed. As for the accelerating process, processing to approach the injection timing to the TDC, and processing to increase the injection stages can be taken. As for the delaying process, processing to separate the injection timing from the TDC, and processing to decrease the injection stages can be taken.

In the process of adjusting the ignition timing, the target value for reducing the difference of the ignition timing to be smaller than the reference time is set based on the actual mixing ratio. In that case, as in the process of adjusting the combustion amount, a provisional target value is acquired based on the reference mixing ratio, and the provisional target value is corrected with the use of the actual mixing ratio to calculate the target value.

When a difference of an ignition timing is smaller than a reference period, it is determined that a processing of adjusting the ignition timing is unnecessary, and the present pilot control processing is terminated. Steps S107, S109, and S111 correspond to a combustion control unit.

As follows, operational effects of the first embodiment described above will be described.

According to the first embodiment, since three combustion parameters including the combustion amount, the combustion region, and the ignition timing are estimated for the pilot combustion caused by the pilot injection, the state of the pilot combustion gas caused by the pilot injection can be obtained. In other words, the tendency of the ignition of the fuel caused by the main injection can be obtained. The inventors have acquired knowledge that a correlation between the three combustion parameters does not have a regularity relative to the mixing ratio of the molecular structural species contained in the fuel. Since each of the three combustion parameters is estimated based on the actual mixing ratio, the estimation precision of the pilot combustion can be ensured appropriately. Thus, when an unexpected fuel is used while the combustion parameters are managed appropriately, the state of the main combustion caused by the main injection can be adjusted.

According to the first embodiment, the three combustion parameters are estimated by using the OH radical distribution in addition of five injection parameters including the injection amount, the lower heat generation amount, the penetration, the diffusion state, and the ignition delay characteristic. In this case, since the injection parameters and the OH radical are estimated by using the actual mixing ratio, the estimation of the combustion parameter is performed indirectly by using the actual mixing ratio. In this case, for example, as compared with the case where the combustion parameter is directly estimated with the use of the function, the map, or the model for the actual mixing ratio, the degree of dependence of the estimation result on the functions, the maps, and the models can be lowered, and the difficulty of creating the functions, the maps and the models can be lowered. For that reason, the estimation precision of the combustion parameter can be improved.

According to the first embodiment, five injection parameters and the OH radical distribution with the injection are individually estimated based on the actual mixing ratio. Thus, when an influence level of the actual mixing ratio differs in each injection parameter, the combustion amount can be estimated by considering variation of the influence level of the actual mixing ratio by using all of the five injection parameters and the OH radical distribution with the injection in the estimation of the combustion amount. The inventors have acquired knowledge that five injection parameters and the OH radical distribution with the injection have a correlation according to the actual mixing ratio, by a test, a simulation, or the like. The estimation precision of the combustion amount can be improved by using all of five injection parameters and the OH radical distribution with the injection.

According to the first embodiment, since all of five injection parameters and the OH radical distribution with the injection are used in the estimation of the combustion amount, the estimation precision of the combustion amount can be improved.

According to the first embodiment, since five of five injection parameters and the OH radical distribution with the injection including the injection amount, the penetration, the diffusion state, the ignition delay characteristic, and the OH radical distribution in the estimation of the combustion region, a processing load in the estimation can be reduced. In addition, in estimating the combustion region, no use of the lower heat generation amount, which is less susceptible to the combustion region, means that the influence of the actual mixing ratio on the estimation of the lower heat generation amount is not included in the estimation result of the combustion region. For that reason, the estimation precision can be restricted from being lowered with an increase in the number of injection parameters used for estimation of the combustion region.

According to the first embodiment, since four of five injection parameters and the OH radical distribution with the injection including the injection amount, the diffusion state, the ignition delay characteristic, and the OH radical distribution are used in the estimation of the ignition timing, a processing load of the estimation can be reduced. In this example, in estimating the ignition timing, no use of the lower heat generation amount and the penetration, which are less susceptible to the ignition timing, means that the influence of the actual mixing ratio on the estimation of the lower heat generation amount and the penetration is not included in the estimation result of the combustion region. For that reason, the estimation precision can be restricted from being lowered with an increase in the number of injection parameters used for estimation of the ignition timing.

According to the first embodiment, since the OH radical distribution is estimated based on the actual mixing ratio, the distribution of the combustion of combustible molecules produced by the chain branching reaction can be obtained in the low temperature range where the pilot injection is executed. Thus, when a required period from the chain branching reaction to the ignition differs according to the fuel component, the ignition timing can be estimated appropriately. Further, since the OH radical distribution is estimated based on four injection parameters including the injection amount, the lower heat generation amount, the penetration, and the diffusion state in addition of the actual mixing ratio, the amount of the OH radical, the density of the OH radical, and the position of the OH radical can be estimated as the distribution. Thus, the estimation precision of the OH radical distribution can be improved.

According to the first embodiment, since the OH radical distribution is used in the estimation of three combustion parameters, the state of the combustion gas caused by the pilot injection can be obtained by considering the distribution of the molecules produced by the chain branching reaction in the low temperature range where the pilot injection is executed. The tendency of the ignition of the fuel is more likely to be influenced by the decomposition reaction of $H_2O_2$ than by the chain branching reaction, in the low temperature range comparing the high temperature range where the main injection and the after injection is executed or the medium temperature range where the post injection is executed. Thus, it is effective to use the OH radical distribution in the estimation of three combustion parameters relating to the pilot injection to improve the ignition ability of the main injection by appropriately managing the combustion gas caused by the pilot injection.

According to the first embodiment, the respective processes for adjusting the combustion amount, the combustion region, and the ignition timing are performed based on the actual mixing ratio, the combustion amount. Therefore, a situation, in which the deviations of the combustion amount, the combustion region, and the ignition timing do not fall within the reference amount, the reference distance, and the reference time, respectively, even though those adjusting processes are performed, can be restricted from occurring. For that reason, with the use of the actual mixing ratio, high estimation precision can be effectively leveraged for controlling the internal combustion engine 10 in a configuration in which the estimation precision of the combustion amount, the combustion region, and the ignition timing is enhanced.

Second Embodiment

According to the first embodiment, the state of the combustion gas is estimated based on the combustion parameter including the combustion amount and the like for the pilot injection. According to a second embodiment, the state of the combustion gas is estimated based on the ignition delay characteristic and the OH radical distribution. The pilot control processing according to the present embodiment will be described referring to flowcharts of FIGS. 22 and 23.

Figure 22:
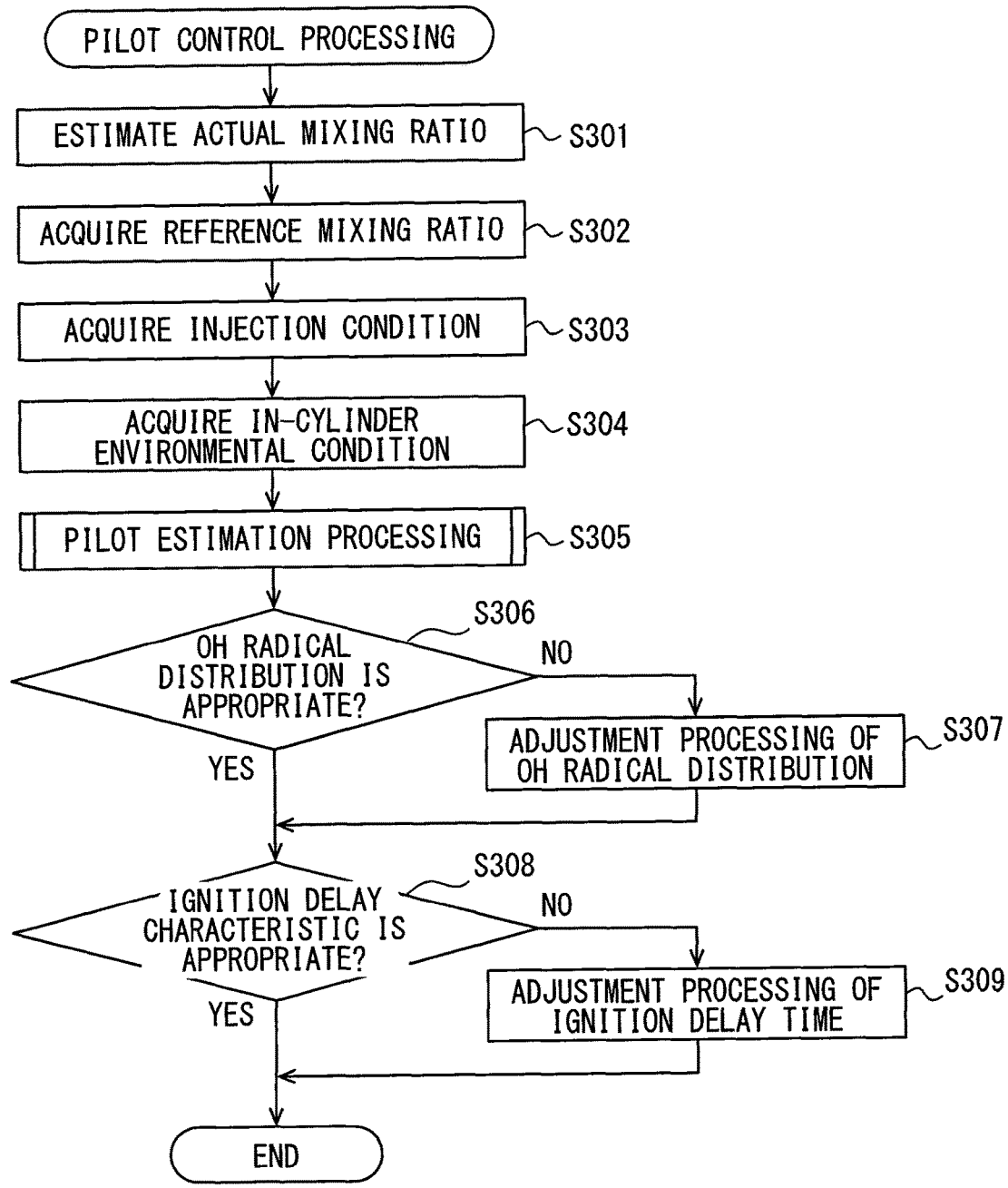
FIG. 22 is a flowchart showing a procedure of the pilot control processing according to a second embodiment.
Figure 23:
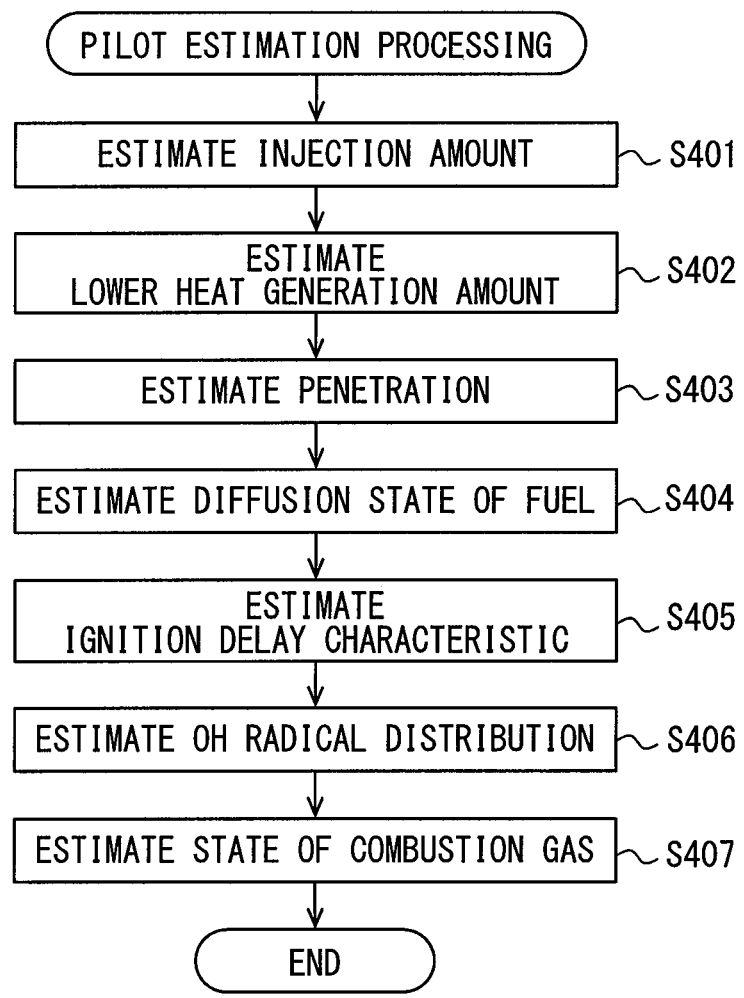
FIG. 23 is a flowchart showing a procedure of the pilot estimation processing.

In FIG. 22, in steps S301 to S305, the same processing as steps S101 to S105 of the first embodiment is performed. However, the pilot estimation processing of step S305 does not execute the estimation of three combustion parameters including the combustion amount, the combustion region, and the ignition timing. Specifically, in FIG. 23, the same processing as steps S201 to S206 in the first embodiment is executed at steps S401 to S406. The processing corresponding to steps S207 to S209 in the first embodiment is not executed, and the process proceeds to step S407 and the state of the combustion gas is estimated by the pilot combustion similar to step S210 in the first embodiment.

In step S407, the estimation of the combustion gas uses the ignition delay characteristic and the OH radical distribution without using the three combustion parameters. In this case, the temperature of the pilot combustion gas and the position of the pilot combustion gas are estimated based on the OH radical distribution, and the generation timing of the combustion gas is estimated based on both the OH radical distribution and the ignition delay characteristic. The OH radical distribution includes the amount, density, and position of the generation molecules produced by the chain branching reaction. When the amount of the generation molecules becomes larger, it is more unlikely that the ignition delay of the pilot injection occurs and the ignition delay of the main injection occurs. Further, the position of the pilot combustion gas may be estimated by an OH radical initial generation position, a diffusion ability, or a penetration. Furthermore, when the actual fuel has a characteristic that the ignition delay of the actual fuel is likely to occur, the generation timing of the combustion gas is likely to be delayed.

It is unlikely to assume that a fuel has a density and an ignition ability that are both high. When a density of the fuel is high, it is assumed that an HC ratio that is a ratio between the number of hydrogen atoms and the number of carbon atoms is low and a ratio of aromatics is high in the actual fuel. When the ratio of aromatics is high, it is assumed that the ignition ability of the actual fuel is low. In other words, when the density of the actual fuel is high in a case where the same fuel amount (fuel volume) is injected as the pilot injection amount, the temperature of the pilot combustion gas is likely to increase. Since the aromatics is high, the ignition timing of the pilot combustion delays remarkably. In this case, a correlation which one of a high temperature of the combustion gas and the ignition timing of the pilot influence the ignition delay of the main combustion becomes a correlation of a trade-off. The correlation between the density and the ignition ability becomes complicated due to a correlation between (i) the pilot ignition delay time substantially independent from an injection amount condition that is greater than or equal to a predetermined condition and (ii) a temperature increasing that changes according to the injection amount.

Return to FIG. 22, after the pilot estimation processing, in step S306, it is determined whether the OH radical distribution of the actual fuel is appropriate or not. Herein, data of the OH radical distribution according to an in-cylinder environment is beforehand acquired for the reference fuel through an experiment or the like, and the data is stored in the memory 80b. In this case, the OH radical distribution of the reference fuel is read from the memory 80b, and "deviation" between the OH radical distribution of the reference fuel and the OH radical distribution of the actual fuel is calculated as a difference. It is determined whether the difference is in an allowable range or not. The difference is calculated based on the amount, density, or the position of the OH radical. When it is determined that the difference is not in the allowable range, it is determined that the OH radical distribution of the actual fuel is inappropriate and the process proceeds to step S307.

In step S307, the adjustment process of the OH radical distribution is executed such that the OH radical distribution becomes appropriate. For example, processing to adjust the injection amount or the EGR amount is executed for the amount of the OH radical, processing to adjust the injection pressure is executed for the density of the OH radical, and processing to adjust the injection timing is executed for the position of the OH radical. In the adjustment process of the OH radical distribution, the target value where the difference of the OH radical distribution is in the allowable range is set based on the actual mixing ratio.

In step S308, the ignition delay characteristic of the reference fuel is read from the memory 80b, and "deviation" between the ignition delay characteristic of the reference fuel and the ignition delay characteristic of the actual fuel is calculated as a difference. It is determined whether the difference is in an allowable range or not. The difference is calculated based on a required period necessary until ignition when the fuel is in the in-cylinder environment. When it is determined that the difference is not in the allowable range, it is determined that the ignition delay characteristic of the actual fuel is inappropriate and the process proceeds to step S309.

In step S309, the adjustment process of the ignition delay time is performed such that the difference of the required period of the ignition becomes in the allowable range. For example, when the required period of the ignition is out of the allowable range in a longer side (that is, the required period is longer than an upper limit of the allowable range), the adjustment process is performed such that the ignition delay time becomes shorter. When the required period of the ignition is out of the allowable range in a shorter side (that is, the required period is shorter than a lower limit of the allowable range), the adjustment process is performed such that the ignition delay time becomes longer. As for the adjustment process of the ignition delay time, processing to adjust the injection timing or the injection stage number can be taken. In the adjustment process of the ignition delay time, the target value where the difference of the required period of the ignition becomes in the allowable range is set based on the actual mixing ratio.

According to the second embodiment, since the OH radical distribution and the ignition delay characteristic of the actual fuel relating to the pilot injection are estimated, the state of the combustion gas produced by the pilot combustion can be obtained. Since the combustion of the fuel by the pilot injection heavily depends on the generation of the OH radical by the chain branching reaction, the temperature and position of the combustion gas by the pilot combustion can be estimated by estimating the OH radical distribution. Since a timing of generating the combustion gas depends on the tendency of the ignition of the actual fuel in addition of the chain branching reaction, the generation timing of the combustion gas by the pilot combustion can be estimated by estimating the ignition delay characteristic of the actual fuel. Thus, the state of the main combustion generated by the main injection can be adjusted by managing the pilot injection.

Other Embodiments

The disclosure is not at all limited to the preferred embodiments of the disclosure described above and can be implemented in various modified forms as exemplified below. Not only combination between the elements explicitly specified in each of the embodiments to be capable of being combined with each other but also partial combination between the embodiments can be conducted even without explicit expression insofar as the combination is not particularly hindered.

As a modification 1, the mixing ratio estimation unit 82 may not estimate the mixing ratio of the molecular structural species based on the multiple combustion characteristic values, but may detect the general property of the fuel with a sensor, and estimate the mixing ratio based on the detection result. Specific examples of the above general properties include a fuel density, a kinematic viscosity, a distillation temperature, and the like.

Further, the mixing ratio may be estimated based on both of the estimation result with the mixing ratio estimation unit 82 and the detection result of the sensor. For example, the mixing ratio estimated based on one of the estimation result and the detection result may be corrected based on the other. In addition, the mixing ratio may be estimated with different methods depending on the molecular structural species. For example, the mixing ratio of the first molecular structural species is estimated based on the estimation result of the mixing ratio estimation unit 82, and the mixing ratio of the second molecular structural species is estimated based on the detection result of the sensor.

As a modification 2, instead of estimating the mixing ratio of the molecular structural species contained in the fuel, a mixing ratio of components such as hydrogen, carbon, sulfur, nitrogen, and oxygen contained in the fuel may be estimated. For example, an average number of carbon atoms, an average number of hydrogen atoms, an HC ratio, and the like can be taken as the mixing ratio for hydrogen and carbon. In the present configuration, injection parameters such as the injection amount and combustion parameters such as the combustion amount are estimated based on the mixing ratio of various components. In this way, even in a case where components contained in the actual fuel differ from each other or where the mixing ratio of the components differ, the combustion state caused by pilot injection can be estimated appropriately. The fuel component such as the average number of carbon atoms can also be referred to as an intermediate parameter.

As a modification 3, the control processing of the combustion system may be performed based on an injection parameter that is different from the OH radical distribution and the ignition delay characteristic, without being performed based on the OH radical distribution and the ignition delay characteristic as the second embodiment. For example, a configuration may be employed in which "deviation" between the injection amount of the actual fuel and the injection amount of the reference fuel is calculated as a difference, and the adjustment process of the injection amount is executed based on the difference. Even in this case, it can be avoided that the control precision of the combustion system is excessively decreased due to correlations between six injection parameters.

As a modification 4, the adjustment process of step S107 and the like in the first embodiment, and the adjustment process of step S307 and the like in the second embodiment, may be performed without respect to the actual mixing ratio. For example, a configuration may be employed in which the target injection amount and the like to adjust the combustion amount are set without respect to the actual mixing ratio in step S107, after the combustion amount is estimated based on the actual mixing ratio in step S207, in the first embodiment.

As a modification 5, the combustion parameter including the combustion amount and the like may be estimated by using at least one of six injection parameters including the injection amount and the like in the first embodiment. For example, the combustion amount is estimated with the use of only the injection amount. Even in that case, a certain level of estimation precision in estimating the combustion amount can be ensured due to the issue that the five injection parameters are correlated with each other.

As a modification 6, when the OH radical distribution is estimated, at least one of four injection parameters including the injection amount, the lower heat generation amount, the penetration and the diffusion state may be used without using the four injection parameters. In other words, all the four injection parameters may not be used. In any case, when the OH radical distribution is estimated, at least the actual mixing ratio may be used.

As a modification 7, when the OH radical distribution is estimated, at least one of the in-cylinder temperature, the in-cylinder oxygen concentration, or the injection pressure may be used in addition of the actual mixing ratio. In the above configuration, the required period until the OH radical is generated by the decomposition reaction of $H_2O_2$, and the generation amount of the OH radical can be obtained for the pilot injection. In this case, even though the generation amount of the OH radical by the decomposition reaction of $H_2O_2$ is relatively small in the low temperature range where the pilot injection is executed, the estimation precision of the combustion gas state can be improved by obtaining the generation amount of the OH radical and the required period until the generation.

As a modification 8, the high heat generation amount may be used as the injection parameter without using the low heat generation amount as the injection parameter, for the pilot combustion in the first embodiment. In addition, the heat generation amount including both of the lower heat generation amount and the higher heat generation amount may be used as the injection parameter.

As a modification 9, the injection parameters such as the injection amount and the combustion parameters such as the combustion amount may not be estimated, individually, for each of the actual mixing ratio and the reference mixing ratio. For example, the difference between the actual mixing ratio and the reference mixing ratio is calculated, and the difference of the injection parameter or the difference of the combustion parameter may be estimated according to the difference. In that case, the "deviation" between the combustion state of the reference fuel and the combustion state of the actual fuel is directly estimated.

As a modification 10, the combustion parameter including the combustion amount and the like may be estimated without using the injection parameter including the injection amount and the like in the first embodiment. For example, the combustion amount is not estimated based on the injection parameter, but is estimated based on the detection signal of the in-cylinder pressure sensor 21 and the actual mixing ratio. Even in that case, the actual mixing ratio of the fuel can be reflected in the estimation of the combustion amount.

As a modification 11, the control processing of the main injection may be performed by using the estimation result of the injection parameter or the combustion parameter for the pilot injection. For example, process to make the ignition by the main injection occur is performed when the ignition timing of the actual fuel delays from the ignition timing of the reference fuel by a period exceeding a reference period for the pilot combustion. As the above process, processing to increase the injection stage number, and processing to increase the injection pressure can be taken.

As a modification 12, in various adjustment processes, the amount obtained by adjusting the combustion amount and the like may be stored as the correction amount, and the adjustment of the combustion parameter or the adjustment of the injection parameter may use the correction. For example, amounts obtained by adjusting the injection amount, the injection pressure, and the injection timing are stored as correction amounts in the memory 80b, in the adjustment process of the combustion amount in step S107, in the first embodiment. When the internal combustion engine 10 is activated, the correction amounts are read from the memory 80b, and corrections of the injection amount, the injection pressure, and the injection timing are performed by using the correction amounts. In this case, the pilot injection performed when the internal combustion engine 10 is activated can be adjusted, and thereby can improve a startability of the internal combustion engine 10.

Alternatively, the correction amount may be used in control of the injection parameter or the combustion parameter for the main injection. In this case, the main injection performed in the start of the engine can be adjusted, and thereby can improve the startability of the internal combustion engine 10.

As a modification 13, a property sensor for detecting a general property of a fuel may be provided. For example, a fuel tank or a common rail is provided with the property sensor for detecting a kinematic viscosity and a density of the fuel. In this configuration, the average number of carbon atoms and the average number of hydrogen atoms of the fuel may be estimated based on the detection result of the property sensor. Further, the heat generation amount such as the lower heat generation amount of the fuel may be estimated based on the detection result of the property sensor.

As a modification 14, the in-cylinder temperature may be estimated based on the in-cylinder pressure detected with the in-cylinder pressure sensor 21, instead of being detected with the temperature detection element 21*a*. More specifically, the in-cylinder temperature is calculated according to the in-cylinder pressure, the cylinder capacity, a gas weight in the cylinder, and a gas constant for estimation.

As a modification 15, the unit and/or the function produced with the ECU 80 as the estimation device and the control device of the combustion system can be produced with software stored in a substantive storage medium and a computer executing the software, with software alone, with hardware alone, or with a combination of the software and the hardware. In a case where the combustion system control device is produced with a hardware circuit, for example, it can be produced with an analog circuit or a digital circuit including multiple logic circuits.

The estimation device 80 according to the first disclosure described above is applicable to the combustion system including the internal combustion engine 10. The estimation device 80 includes a mixing acquisition unit S101, a combustion amount estimation unit S207, a combustion region estimation unit S208, and an ignition timing estimation unit S209. The mixing acquisition unit S101 acquires a mixing ratio of various components contained in a fuel used for combustion in the internal combustion engine. The combustion amount estimation unit S207 estimates a combustion amount of the fuel caused by a pilot combustion produced by injecting the fuel into a combustion chamber 11*a* of the internal combustion engine with a pilot injection, based on the mixing ratio acquired by the mixing acquisition unit. The combustion region estimation unit S208 estimates the combustion region of the pilot combustion in the combustion chamber based on the mixing ratio. The ignition timing estimation unit S209 estimates an ignition timing at which an ignition occurs in the combustion chamber by the pilot injection based on the mixing ratio.

According to the first disclosure, since the combustion amount, the combustion region, and the ignition timing are estimated for the pilot combustion caused by the pilot injection, a state of the combustion gas caused by the pilot combustion can be obtained. For example, when the combustion amount is small or when the combustion region is far from an injection source of the fuel or when the ignition timing is late, it is likely that the pilot combustion gas leads to a delay of the ignition delay time of the main spray caused by the main injection. Thus, the pilot combustion gas in a required state can be obtained by appropriately managing the pilot combustion amount, the combustion region, and the ignition timing.

Further, the pilot combustion amount, the combustion region, and the ignition timing are estimated based on the mixing ratio of various components contained in the fuel. Thus, even though components contained in the fuel differ or the mixing ratio of the components differ, the pilot combustion amount, the combustion region, and the ignition timing can be managed appropriately. Thus, when one of fuels have various properties is used, the combustion gas caused by the pilot combustion can managed appropriately. As a result, the state of the main combustion caused by the main injection can be adjusted by managing the pilot injection.

The estimation device 80 according to the second disclosure described above is applicable to the combustion system including the internal combustion engine 10. The estimation device 80 includes a mixing acquisition unit S101, S301, an OH radical estimation unit S206, S406, and an ignition delay estimation unit S205, S405. The mixing acquisition unit S101, S301 acquires a mixing ratio of various components contained in a fuel used for a combustion in the internal combustion engine. The OH radical estimation unit S206, S406 estimates a generation state of an OH radical in a combustion chamber 11*a* of the internal combustion engine as an OH radical distribution, based on the mixing ratio acquired by the mixing acquisition unit, in response to the fuel injected to the combustion chamber by the pilot injection. The ignition delay estimation unit S205, S405 estimates a characteristic of the fuel when ignited as an ignition delay characteristic, based on the mixing ratio.

According to the second disclosure, since the OH radical distribution and the ignition delay characteristic relating to the pilot injection are estimated, the state of the pilot combustion gas produced by the pilot injection can be estimated. The ignition ability of the fuel injected by the main injection can be improved by arranging the pilot combustion gas at an appropriate position at an appropriate timing and temperature.

The inventors have acquired knowledge that a ratio of the chain branching reaction caused by the fuel component is large due to a condition that a temperature increasing in the combustion chamber is insufficient or the like, without executing generation of the OH radical by the decomposition of $H_2O_2$, at the timing that the pilot injection is executed. In the chain branching reaction, a combustive molecule including ketone, aldehyde, and the like is produced while the generation and the consumption of the OH radical are repeatedly executed. In this case, when the OH radical distribution is estimated, a distribution of the combustive molecule is estimated. The temperature and the position of the combustion gas can be estimated from the OH radical distribution.

The inventors have acquired knowledge that the timing that the pilot combustion gas is produced is influenced by the chain branching reaction caused by a linear hydrocarbon component and further by ignition delay characteristic of the fuel component including other side chain, ring-shaped structure, and the like. When the generation timing of the pilot combustion gas is late, it is possible that the state of the main combustion caused by the main injection is deteriorated while the generation of the pilot combustion gas in an appropriate state does not catch up with the main injection. According to the second disclosure, since both the OH radical distribution caused by the linear component and the ignition delay characteristic caused by other molecular structures are estimated, the pilot combustion gas produced by the pilot injection can be managed appropriated. Thus, the state of the main combustion caused by the main injection can be adjusted by managing the pilot injection.

The control device 80 according to the third disclosure described above is applicable to the combustion system including the internal combustion engine 10. The control device 80 includes a mixing acquisition unit S101, a combustion amount estimation unit S206, a region estimation unit S207, a timing estimation unit S208, and a combustion control unit S107, S109, and S111. The mixing acquisition unit S101 acquires a mixing ratio of various components contained in a fuel used for combustion in the internal combustion engine. The combustion amount estimation unit S206 estimates a combustion amount of the fuel caused by a pilot combustion produced by injecting the fuel into a combustion chamber 11a of the internal combustion engine with pilot injection, based on the mixing ratio acquired by the mixing acquisition unit. The region estimation unit S207 estimates a combustion region of the pilot combustion in the combustion chamber based on the mixing ratio. The timing estimation unit S208 estimates an ignition timing, at which ignition occurs in the combustion chamber by the pilot injection, based on the mixing ratio. The combustion control unit S107, S109, and S111 controls the combustion system based on the respective estimation results of the combustion amount estimation unit, the region estimation unit, and the timing estimation unit.

According to the third disclosure, the same advantages as those in the first disclosure can be obtained.

The present disclosure has been described with reference to the examples, but the present disclosure is not limited to the examples or the structures. The present disclosure includes various modification examples and modifications within the same range. In addition, it should be understood that various combinations or aspects, or other combinations or aspects, in which only one element, one or more elements, or one or less elements is included to the various combinations or aspects, are included in the scope or the technical idea of the present disclosure.

The invention claimed is:

1. A fuel control system applicable to a combustion system including an internal combustion engine, the fuel control system comprising:
at least one sensor configured to detect a physical property related to combustion indicative of a mixing ratio of various components contained in the fuel used for combustion in the internal combustion engine; and
a controller coupled to the at least one sensor, the controller including a processor and a memory storing program instructions that, when executed by the processor, causes the processor to:
acquire, from the physical property detected by the at least one sensor, the mixing ratio of various components contained in the fuel used for combustion in the internal combustion engine,
calculate, based on the mixing ratio:
an injection amount caused by the pilot injection,
a heat generation amount of the fuel caused by the pilot combustion,
a penetration force of the fuel caused by the pilot injection,
a diffusion state of the fuel caused by the pilot injection,
an ignition delay characteristic representing a delay time of the ignition caused by the pilot injection, and
an OH radical distribution representing a generation state of an OH radical in the combustion chamber caused by the pilot injection, and
estimate, based on the mixing ratio:
a combustion amount of the fuel caused by a pilot combustion produced by injecting the fuel into a combustion chamber of the internal combustion engine with a pilot injection,
a combustion region of the pilot combustion in the combustion chamber, and
an ignition timing at which an ignition occurs in the combustion chamber with the pilot injection, wherein the program instructions stored in the memory further cause the processor to:
estimate the combustion amount based on the injection amount, the heat generation amount, the penetration force, the diffusion state, the ignition delay characteristic, and the OH radical distribution,
estimate the combustion region based on the injection amount, the penetration force, the diffusion state, the ignition delay characteristic, and the OH radical distribution, or
estimate the ignition timing based on the injection amount, the diffusion state, the ignition delay characteristic, and the OH radical distribution.

2. A fuel control system applicable to a combustion system including an internal combustion engine, the fuel control system comprising:
at least one sensor configured to detect a physical property related to combustion indicative of a mixing ratio of various components contained in the fuel used for combustion in the internal combustion engine; and
a controller coupled to the at least one sensor, the controller including a processor and a memory storing program instructions that, when executed by the processor, causes the processor to:
acquire, from the physical property detected by the at least one sensor, the mixing ratio of various components contained in a fuel used for a combustion in the internal combustion engine,
estimate, based on the mixing ratio, a generation state of an OH radical in a combustion chamber of the internal combustion engine as an OH radical distribution in response to the fuel injected to the combustion chamber by the pilot injection, and
estimate, based on the mixing ratio, a characteristic of the fuel when ignited as an ignition delay characteristic.

3. A fuel control system applicable to a combustion system including an internal combustion engine, the fuel control system comprising:
at least one sensor configured to detect a physical property related to combustion indicative of a mixing ratio of various components contained in the fuel used for combustion in the internal combustion engine; and
a controller coupled to the at least one sensor, the controller including a processor and a memory configured to store computer program instructions that, when executed by the processor, causes the processor to:
acquire, from the physical property detected by the at least one sensor, the mixing ratio of various components contained in the fuel used for combustion in the internal combustion engine,
calculate, based on the mixing ratio:
an injection amount caused by the pilot injection,
a heat generation amount of the fuel caused by the pilot combustion,
a penetration force of the fuel caused by the pilot injection,
a diffusion state of the fuel caused by the pilot injection, and
an OH radical distribution representing a generation state of an OH radical in the combustion chamber caused by the pilot injection, the OH radical distribution is further calculated based on the injection amount, the heat generation amount, the penetration force, and the diffusion state, and estimate, based on the mixing ratio:
- a combustion amount of the fuel caused by a pilot combustion produced by injecting the fuel into a combustion chamber of the internal combustion engine with a pilot injection,
- a combustion region of the pilot combustion in the combustion chamber, and
- an ignition timing at which an ignition occurs in the combustion chamber with the pilot injection.

* * * * *